US012451038B2

(12) United States Patent
Jung

(10) Patent No.: US 12,451,038 B2
(45) Date of Patent: Oct. 21, 2025

(54) DRIVING CIRCUIT, DISPLAY DEVICE INCLUDING THE SAME, AND METHOD OF DRIVING THE SAME

(71) Applicant: Samsung Display Co., LTD., Yongin-si (KR)

(72) Inventor: Ha Yong Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 45 days.

(21) Appl. No.: 18/387,827

(22) Filed: Nov. 7, 2023

(65) Prior Publication Data

US 2024/0355247 A1 Oct. 24, 2024

(30) Foreign Application Priority Data

Apr. 18, 2023 (KR) ........................ 10-2023-0051020

(51) Int. Cl.

*G09G 3/00* (2006.01)
*G09G 3/20* (2006.01)
*G09G 3/3233* (2016.01)

(52) U.S. Cl.

CPC ........... *G09G 3/006* (2013.01); *G09G 3/2096* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2330/08* (2013.01); *G09G 2330/12* (2013.01)

(58) Field of Classification Search

CPC .... G09G 3/006; G09G 3/2096; G09G 3/3233; G09G 3/3275; G09G 3/3225; G09G 3/3648; G09G 3/20; G09G 2300/0819; G09G 2300/0842; G09G 2300/0861; G09G 2310/08; G09G 2330/08; G09G 2330/12; G09G 2330/10; G09G 2320/0233

See application file for complete search history.

(56) References Cited

U.S. PATENT DOCUMENTS 9,378,673 B2 6/2016 Oh et al.
2013/0050292 A1* 2/2013 Mizukoshi ........... G09G 3/3233 345/77
2013/0070135 A1* 3/2013 Bahukhandi ........... H04N 25/75 348/300
2018/0053462 A1* 2/2018 Bae ....................... G09G 3/2074
2018/0082639 A1* 3/2018 Shin ...................... G09G 3/3266
2020/0357338 A1* 11/2020 Lee ....................... G09G 3/3258

(Continued)

FOREIGN PATENT DOCUMENTS

KR 101492694 B1 2/2015
KR 102045807 B1 12/2019

(Continued)

*Primary Examiner* — Christopher E Leiby

(74) *Attorney, Agent, or Firm* — CANTOR COLBURN LLP

(57) ABSTRACT

A driving circuit includes: a sensing component including a sensing channel shared by a first sub-sensing line connected to a first pixel and a second sub-sensing line connected to a second pixel; a first storage configured to store line capacitance information of the first sub-sensing line and the second sub-sensing line; and a timing controller configured to correct sensing data supplied from the sensing component using the line capacitance information, and generate output data using the corrected sensing data.

20 Claims, 27 Drawing Sheets

20: 11, 15

(56) References Cited

U.S. PATENT DOCUMENTS

| | | | | |
|---|---|---|---|---|
| 2022/0335866 | A1* | 10/2022 | Lee | G09G 3/3291 |
| 2023/0317001 | A1 | 10/2023 | Jung et al. | |
| 2024/0119891 | A1* | 4/2024 | Lee | G09G 3/32 |
| 2024/0290246 | A1* | 8/2024 | Seo | G09G 3/3266 |

FOREIGN PATENT DOCUMENTS

| | | | |
|---|---|---|---|
| KR | 102476467 | B1 | 12/2022 |
| KR | 1020230143252 | A | 10/2023 |

* cited by examiner

DRIVING CIRCUIT, DISPLAY DEVICE INCLUDING THE SAME, AND METHOD OF DRIVING THE SAME

This application claims priority to Korean patent application number 10-2023-0051020 filed on Apr. 18, 2023, and all the benefits accruing therefrom under 35 U.S.C. § 119, the content of which in its entirety is herein incorporated by reference.

BACKGROUND

Field of Invention

Various embodiments of the present disclosure related to a driving circuit, a display device including the driving circuit, and a method of driving the display device.

Description of Related Art

With the development of information technology, the importance of a display device, which is a connection medium between a user and information, has been emphasized. Owing to the importance of the display device, the use of various kinds of display devices, such as a liquid crystal display device and an organic light-emitting display device, has increased.

Pixels of the display device may degrade over time due to factors such as duration of use and display luminance. Hence, data correction (grayscale correction) may be needed. To achieve the above purpose, an external compensation method has been used, where a certain voltage (and/or current) is supplied from the pixels, and data is corrected using the supplied voltage (or sensing voltage).

For example, a sensing component may generate sensing data using a sensing voltage. The timing controller may correct external input data using the sensing data. Here, in the case where respective line capacitances of the sensing lines are set to be different from each other, the sensing voltage may be set to different values even if the pixels have the same characteristics. As a result, the reliability of compensation may be reduced.

SUMMARY

Various embodiments of the present disclosure are related to correcting sensing data using line capacitance of sensing lines, thus securing the reliability of compensation regardless of line capacitance.

An embodiment of the present disclosure provides a driving circuit including: a sensing component including a sensing channel shared by a first sub-sensing line connected to a first pixel and a second sub-sensing line connected to a second pixel; a first storage configured to store line capacitance information of the first sub-sensing line and the second sub-sensing line; and a timing controller configured to correct sensing data supplied from the sensing component using the line capacitance information, and generate output data using the corrected sensing data.

In an embodiment, the driving circuit may further include: a second storage configured to store first sensing data generated from the first pixel during a first sensing period within a divided sensing period; a third storage configured to store second sensing data generated from the second pixel during a second sensing period within the divided sensing period; and a fourth storage configured to store first normal sensing data generated from the first pixel during a first normal sensing period, and store second normal sensing data generated from the second pixel during a second normal sensing period.

In an embodiment, the sensing channel may include: a first sensing capacitor connected to the first sub-sensing line, and configured to store a first sensing voltage; a second sensing capacitor connected to the second sub-sensing line, and configured to store a second sensing voltage; and a sampling switch connected to the first sub-sensing line and the second sub-sensing line. In the first normal sensing period, the second normal sensing period, and the first sensing period, the sampling switch may remain turned on during a period in which voltages are stored in the first sensing capacitor and the second sensing capacitor, and in the second sensing period, the sampling switch may be set to be turned on after voltages are stored in the first sensing capacitor and the second sensing capacitor.

In an embodiment, the sensing component may further include a sensing circuit configured to determine an offset by subtracting the second sensing data from the second normal sensing data, generate line capacitance information of the second sub-sensing line using the offset, and store the line capacitance information of the second sub-sensing line in the first storage.

In an embodiment, the sensing circuit may set the line capacitance information of the first sub-sensing line that shares the sensing channel with the second sub-sensing line, to be identical to the line capacitance information of the second sub-sensing line, and store the set line capacitance information of the first sub-sensing line in the first storage.

In an embodiment, the sensing circuit may interpolate the line capacitance information of the second sub-sensing line and generate the line capacitance information of the first sub-sensing line adjacent thereto using the interpolation, and store the generated line capacitance information of the first sub-sensing line in the first storage.

In an embodiment, the line capacitance information stored in the first storage may be reset every cycle.

In an embodiment, the first pixel and the second pixel may be positioned in the same pixel row.

An embodiment of the present disclosure provides a display device, including: first pixels and second pixels located adjacent to each other in a certain pixel row in a pixel component; first sub-sensing lines connected to the first pixels, respectively; second sub-sensing lines connected to the second pixels, respectively; a sensing component including a plurality of sensing channels sharing one of the first sub-sensing lines and one of the second sub-sensing lines; a first storage configured to store line capacitance information of the first sub-sensing lines and the second sub-sensing lines; and a timing controller configured to correct sensing data supplied from the sensing component using the line capacitance information, and generate output data using the corrected sensing data.

In an embodiment, the first pixels may be positioned in odd-numbered pixel columns, and the second pixels may be positioned in even-numbered pixel columns.

In an embodiment, the display device may include a normal sensing period in which the first pixels and the second pixels are simultaneously sensed, and a divided sensing period in which the first pixels and the second pixels are sequentially sensed.

In an embodiment, the display device may further include: a second storage configured to store first sensing data sensed from the first pixels during a first sensing period within the divided sensing period; a third storage configured to store second sensing data sensed from the second pixels during a second sensing period within the divided sensing period; and a fourth storage configured to store normal sensing data sensed from the first pixels and the second pixels during the normal sensing period.

In an embodiment, the sensing data supplied from the sensing component may include the first sensing data and the second sensing data, or may include the normal sensing data.

In an embodiment, the display device may further include a sensing circuit configured to determine an offset by subtracting the second sensing data from the normal sensing data corresponding to the second pixels, generate line capacitance information of each of the second sub-sensing lines using the offset, and store the line capacitance information of each of the second sub-sensing lines in the first storage.

In an embodiment, the sensing circuit may set the line capacitance information of the first sub-sensing lines in the certain pixel row to be identical to the line capacitance information of the second sub-sensing lines that share the sensing channel with the first sub-sensing lines, and stores the set line capacitance information of the first sub-sensing lines in the first storage.

In an embodiment, all pixel rows included in the display device may have the same line capacitance information as the certain pixel row.

In an embodiment, the sensing circuit may interpolate the line capacitance information of a second sub-sensing line of the second sub-sensing lines in the certain pixel row and generate the line capacitance information of a first sub-sensing line of the first sub-sensing lines adjacent thereto using the interpolation, and store the generated line capacitance information of the first sub-sensing line in the first storage.

In an embodiment, the line capacitance information stored in the first storage may be reset every cycle.

In an embodiment, the display device may further include a sensing circuit configured to: sequentially sense the first pixels during a first sensing period within the divided sensing period, and the second pixels during a second sensing period within the divided sensing period, and sequentially sense the second pixels during a first sensing period within a subsequent divided sensing period, and the first pixels during a second sensing period within the subsequent divided sensing period; generate line capacitance information of each of the first sub-sensing lines using an offset generated by subtracting first sensing data of the first pixels generated during the second sensing period from normal sensing data corresponding to the first pixels; and generate line capacitance information of each of the second sub-sensing lines using an offset generated by subtracting second sensing data of the second pixels generated during the second sensing period from normal sensing data corresponding to the second pixels.

An embodiment of the present disclosure may provide a method of driving a display device including a plurality of sensing channels, each connected both to one of first sub-sensing lines connected to first pixels and to one of second sub-sensing lines connected to second pixels. The method includes: storing first normal sensing data generated from a first pixel of the first pixels during a first normal sensing period; storing second normal sensing data generated from a second pixel of the second pixels during a second normal sensing period; storing first sensing data generated from the first pixel during a first sensing period within a divided sensing period; storing second sensing data generated from the second pixel during a second sensing period within the divided sensing period; and generating output data by adjusting input data based on an offset value generated by subtracting the second sensing data from the second normal sensing data.

In an embodiment, generating the output data may include: correcting the first sensing data using line capacitance information of the first sub-sensing line connected to the first pixel; correcting the second sensing data using line capacitance information of the second sub-sensing line connected to the second pixel; and generating the output data using the corrected first sensing data and the corrected second sensing data.

In an embodiment, the sensing channel may include: a first sensing capacitor connected to the first sub-sensing line and configured to store a first sensing voltage; a second sensing capacitor connected to the second sub-sensing line and configured to store a second sensing voltage; and a sampling switch connected to the first sub-sensing line and the second sub-sensing line. In the first normal sensing period, the second normal sensing period, and the first sensing period, the sampling switch may remain turned on during a period in which voltages are stored in the first sensing capacitor and the second sensing capacitor, and in the second sensing period, the sampling switch may be set to be turned on after voltages are stored in the first sensing capacitor and the second sensing capacitor.

The aspects of the present disclosure are not limited to the above-stated aspect, and those skilled in the art will clearly understand other not mentioned aspects from the accompanying claims.

DETAILED DESCRIPTION

Figure 1:
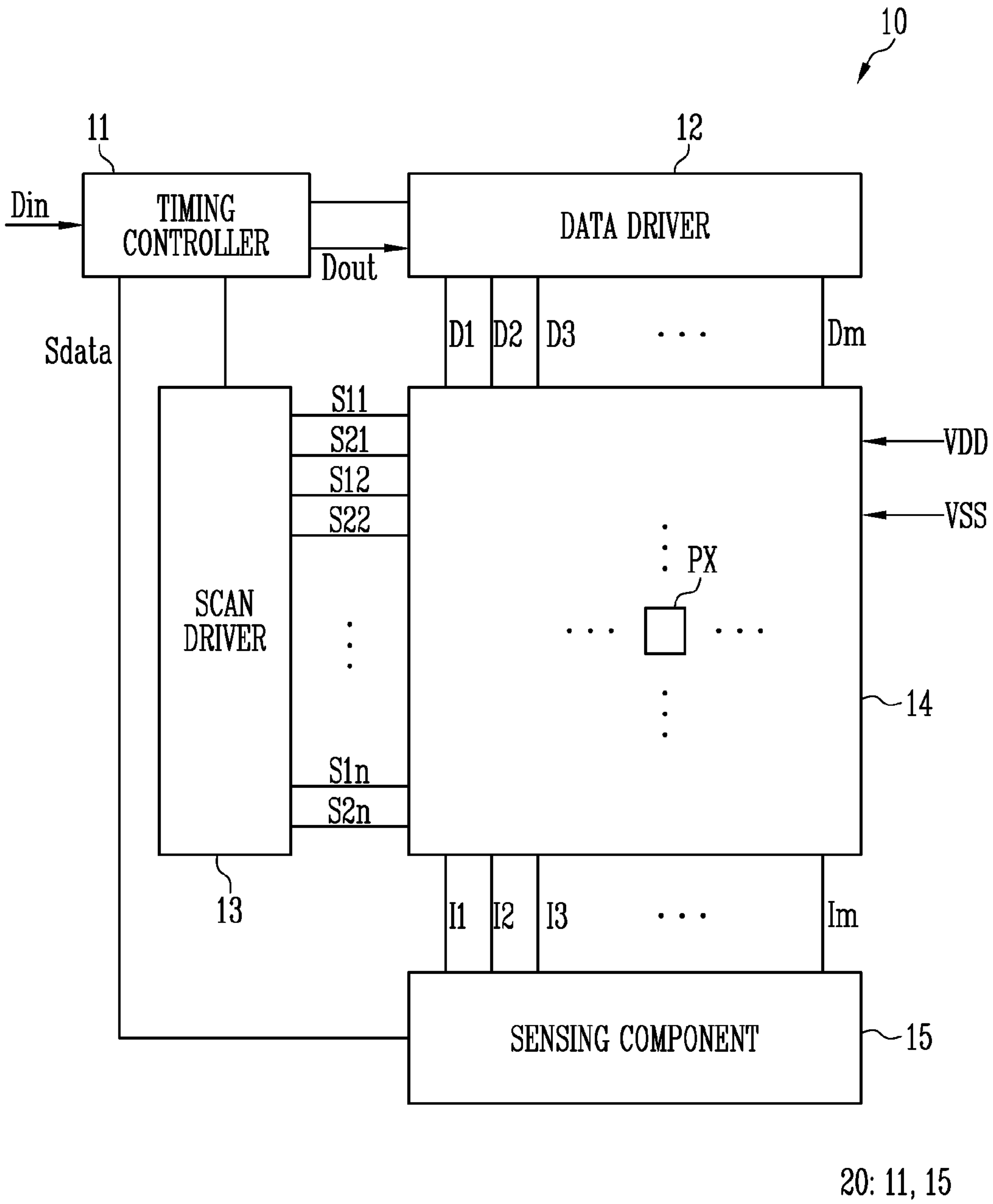
FIG. 1 is a diagram illustrating a display device in accordance with an embodiment of the present disclosure.

Hereinafter, embodiments of the present invention will be described in detail with reference to the attached drawings, such that those skilled in the art can easily implement the present invention. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules are physically implemented by logic circuits, discrete components, microprocessors, hard-wired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the invention. In some embodiments, blocks, units and/or modules may be physically combined into more complex blocks, units and/or modules without departing from the scope of the invention.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

However, the present disclosure is not limited to the following embodiments and may be modified into various forms. Each embodiment to be described below may be implemented alone, or combined with at least another embodiment to make various combinations of embodiments.

FIG. 1 is a diagram illustrating a display device 10 in accordance with an embodiment of the present disclosure.

Referring to FIG. 1, the display device 10 in accordance with an embodiment of the present disclosure may include a driving circuit 20, a data driver 12, a scan driver 13, and a pixel component 14. The driving circuit 20 may including a timing controller 11 and a sensing component 15.

The timing controller 11 and the sensing component 15 that are included in the driving circuit 20 may be integrated into one integrated circuit ("IC"). Furthermore, the timing controller 11, the data driver 12, and the sensing component 15 may be integrated into one IC. Depending on the specifications of the display device 10, the timing controller 11, the data driver 12, and the sensing component 15 may be integrated into a plurality of ICs.

The timing controller 11 may receive, from an external process, input data Din and control signals that correspond to each frame. Here, the processor may include at least one of a graphics processing unit ("GPU"), a central processing unit ("CPU"), an application processor ("AP"), and the like.

The timing controller 11 may correct the input data Din and generate output data Dout, and supply the generated output data Dout to the data driver 12. The timing controller 11 may correct the input data Din in response to sensing data Sdata supplied from the sensing component 15, and generate the output data Dout. In this case, the input data Din may be corrected in response to the threshold voltage and/or mobility of a driving transistor included in the pixel PX. Furthermore, the timing controller 11 may correct the input data Din in response to a light measurement result of the pixel component 14 measured during a manufacturing process. In an embodiment, the timing controller 11 may correct the input data Din using various known methods, and generate the output data Dout.

The timing controller 11 may provide control signals suitable for specifications of the data driver 12, the scan driver 13, and the sensing component 15, respectively.

During a display period, the data driver 12 may generate, using the output data Dout and the control signals that are provided from the timing controller 11, data signals (that is, data voltages) to be supplied to the data lines D1 to Dm (where "m" is a natural number). The data driver 12 may supply data signals to the data lines D1 to Dm on a pixel row basis (that is, a horizontal line basis). Here, the term "pixel row" refers to a horizontal line in which the pixels PX that are connected to the same scan line are located.

During a sensing period, the data driver 12 may supply a certain voltage to the data lines D1 to Dm. The certain voltage may be set to allow the driving transistors included in the respective pixels PX to be turned on.

In response to the control signals supplied from the timing controller 11, the scan driver 13 may supply first scan signals to first scan lines S11 to S1*n* (where "n" is a natural number), and supply second scan signals to second scan lines S21 to S2*n*.

In an embodiment, for example, the scan driver 13 may sequentially supply first scan signals each having a gate-on voltage (that is, a turn-on level) to the first scan lines S11 to S1*n*. Furthermore, the scan driver 13 may sequentially supply second scan signals each having a gate-on voltage to the second scan lines S21 to S2*n*. Although FIG. 1 illustrates that one scan driver 13 drives the first scan lines S11 to S1*n* and the second scan lines S21 to S2*n*, the present disclosure is not limited thereto. For another example, the first scan lines S11 to S1*n* and the second scan lines S21 to S2*n* may be supplied with scan signals from different scan drivers, respectively.

The sensing component 15 may be connected to sensing lines I1, I2, I3, . . . , and Im. In an embodiment, for example, the sensing lines I1 to Im may be formed in the pixel columns, respectively.

During a display period, the sensing component 15 may supply a voltage of an initialization power supply to the sensing lines I1 to Im. During a sensing period, the sensing component 15 may receive sensing voltages (or sensing current) from the pixels PX connected to the sensing lines I1 to Im. Here, information about the threshold voltage and/or mobility of the driving transistor included in each of the pixels PX may be included in the corresponding sensing voltage. The sensing component 15 may convert an analog sensing voltage to digital sensing data Sdata, and supply the converted digital sensing data Sdata to the timing controller 11.

In addition, the sensing component 15 may include a multiplexer, and may receive a first sensing voltage sequentially from first pixels {e.g., pixels located in odd-numbered pixel columns (that is, vertical lines)} among the pixels PX located in a specific pixel row during a first sensing period of the sensing period, and may receive a second sensing voltage sequentially from second pixels (e.g., pixels located in even-numbered pixel columns) among the pixels PX located in the specific pixel row during a second sensing period of the sensing period. Here, the term "pixel column" refers to a vertical line on which the pixels PX that are connected to the same data line are located.

The pixel component 14 includes pixels PX. The pixels PX may receive data signals and display an image. To this end, each pixel PX may be connected to a corresponding data line (one of D1 to Dm), corresponding scan lines (one of S11 to S1*n* and one of S21 to S2*n*), and a corresponding sensing line (one of I1 to Im). The pixels PX may be supplied with a voltage between a first power supply VDD and a second power supply VSS from an external device. In an embodiment, the first power supply VDD may be set to a voltage higher than the second power supply VSS.

Figure 2:
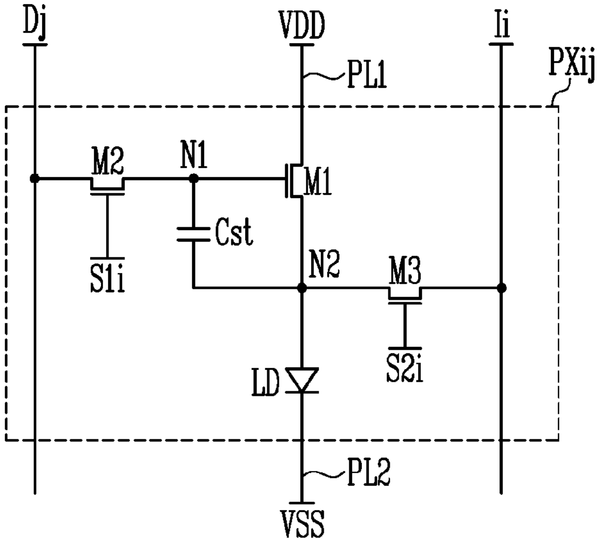
FIG. 2 is a diagram illustrating a pixel in accordance with an embodiment of the present disclosure.

FIG. 2 is a diagram illustrating a pixel PXij in accordance with an embodiment of the present disclosure. FIG. 2 illustrates a pixel PXij located on an i-th horizontal line and a j-th vertical line (where "i" and "j" are natural numbers).

Referring to FIG. 2, the pixel PXij in accordance with an embodiment of the present disclosure may include transistors M1 to M3, a storage capacitor Cst, and a light emitting element LD.

The light emitting element LD may be connected between a first power line PL1 to which the first power supply VDD is to be supplied, and a second power line PL2 to which the second power supply VSS is to be supplied. In an embodiment, for example, a first electrode (e.g., an anode electrode) of the light emitting element LD may be connected to the first power line PL1 via a second node N2 and the first transistor M1. A second electrode (e.g., a cathode electrode) of the light emitting element LD may be connected to the second power line PL2. The light emitting element LD may emit light at a luminance corresponding to driving current supplied from the first transistor M1.

The voltage of the first power supply VDD and the voltage of the second power supply VSS may have a potential difference therebetween to allow the light emitting element LD to emit light. In an embodiment, for example, the first power supply VDD may be a high-potential power supply having a high voltage. The second power supply VSS may be a low-potential power supply having a low voltage.

An organic light emitting diode may be selected as the light emitting element LD. Furthermore, an inorganic light emitting diode such as a micro light emitting diode ("LED") or a quantum dot light emitting diode may be selected as the light emitting element LD. The light emitting element LD may be an element formed of a combination of organic material and inorganic material. Although FIG. 2 illustrates that the pixel PXij includes a single light emitting element LD, the pixel PXij in an embodiment may include a plurality of light emitting elements. The plurality of light emitting elements may be connected in series, parallel or series-parallel to each other.

Each of the transistors M1, M2, and M3 may be formed of an N-type transistor. Alternatively, each of the transistors M1, M2, and M3 may be formed of a P-type transistor. As a further alternative, the transistors M1, M2, and M3 may be formed of a combination of N-type transistors and P-type transistors. Each transistor may be configured in various forms such as a thin film transistor ("TFT"), a field effect transistor ("FET"), and a bipolar junction transistor ("BJT") in an embodiment.

The first transistor M1 (that is, a driving transistor) is connected between the first power line PL1 and the second node N2. A gate electrode of the first transistor M1 is connected to a first node N1. The first transistor M1 may control, in response to a voltage of the first node N1, the amount of current flowing from the first power supply VDD to the second power supply VSS via the light emitting element LD. The first transistor M1 may be referred to as a driving transistor.

The second transistor M2 may be connected between a data line Dj and the first node N1. A gate electrode of the second transistor M2 may be connected to the first scan line S1*i*. When a first scan signal is supplied to the first scan line S1*i*, the second transistor M2 may be turned on to electrically connect the data line Dj to the first node N1. The second transistor M2 may be referred to as a switching transistor.

The third transistor M3 may be connected between the second node N2 and a sensing line Ii. A gate electrode of the third transistor M3 may be connected to the second scan line S2*i*. When a second scan signal is supplied to the second scan line S2*i*, the third transistor M3 may be turned on to electrically connect the sensing line Ii to the second node N2.

The storage capacitor Cst may be connected between the first node N1 and the second node N2. The storage capacitor Cst may store a voltage corresponding to a difference in voltage between the first node N1 and the second node N2.

Figure 3:
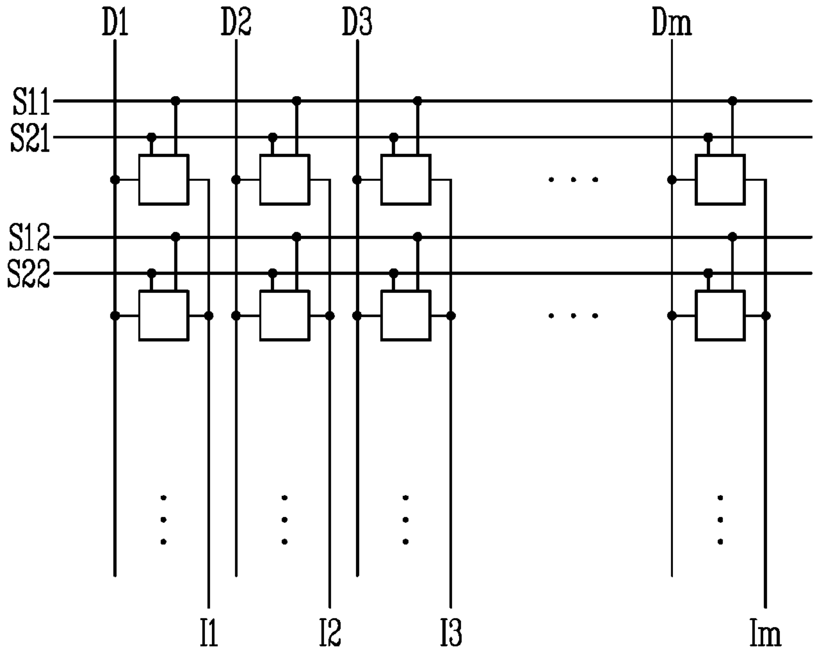
FIG. 3 is a diagram illustrating an embodiment of sensing lines illustrated in FIG. 1.

FIG. 3 is a diagram illustrating an embodiment of the sensing lines I1 to Im illustrated in FIG. 1.

Referring to FIG. 3, the sensing lines 1I to Im may be disposed in the pixel columns, respectively. Here, each of the sensing lines 1I to Im may be electrically connected to the pixels PX that are located in the corresponding same pixel column.

In an embodiment, for example, the first sensing line I1 may be electrically connected to the pixels PX that are located in the first pixel column. Here, the pixels PX located in the first pixel column may be electrically connected to the first data line D1.

In an embodiment, among the sensing lines I1 to Im, the sensing lines located in adjacent pixel columns may share a single sensing channel. In an embodiment, for example, the first sensing line I1 and the second sensing line I2 may share a single sensing channel. For instance, each of the sensing lines I1, I3, . . . located in the odd-numbered pixel columns may share a sensing channel with a sensing line I2, . . . located on a corresponding even-numbered pixel.

Hereinafter, for the convenience of explanation, an odd-numbered (or an even-numbered) sensing line of the adjacent sensing lines that share the sensing channel will be referred to as a first sub-sensing line, and an even-numbered (or an odd-numbered) sensing line will be referred to as a second sub-sensing line. Furthermore, a pixel connected to the first sub-sensing line will be referred to as a first pixel, and a pixel connected to the second sub-sensing line will be referred to as a second pixel.

Figure 4:
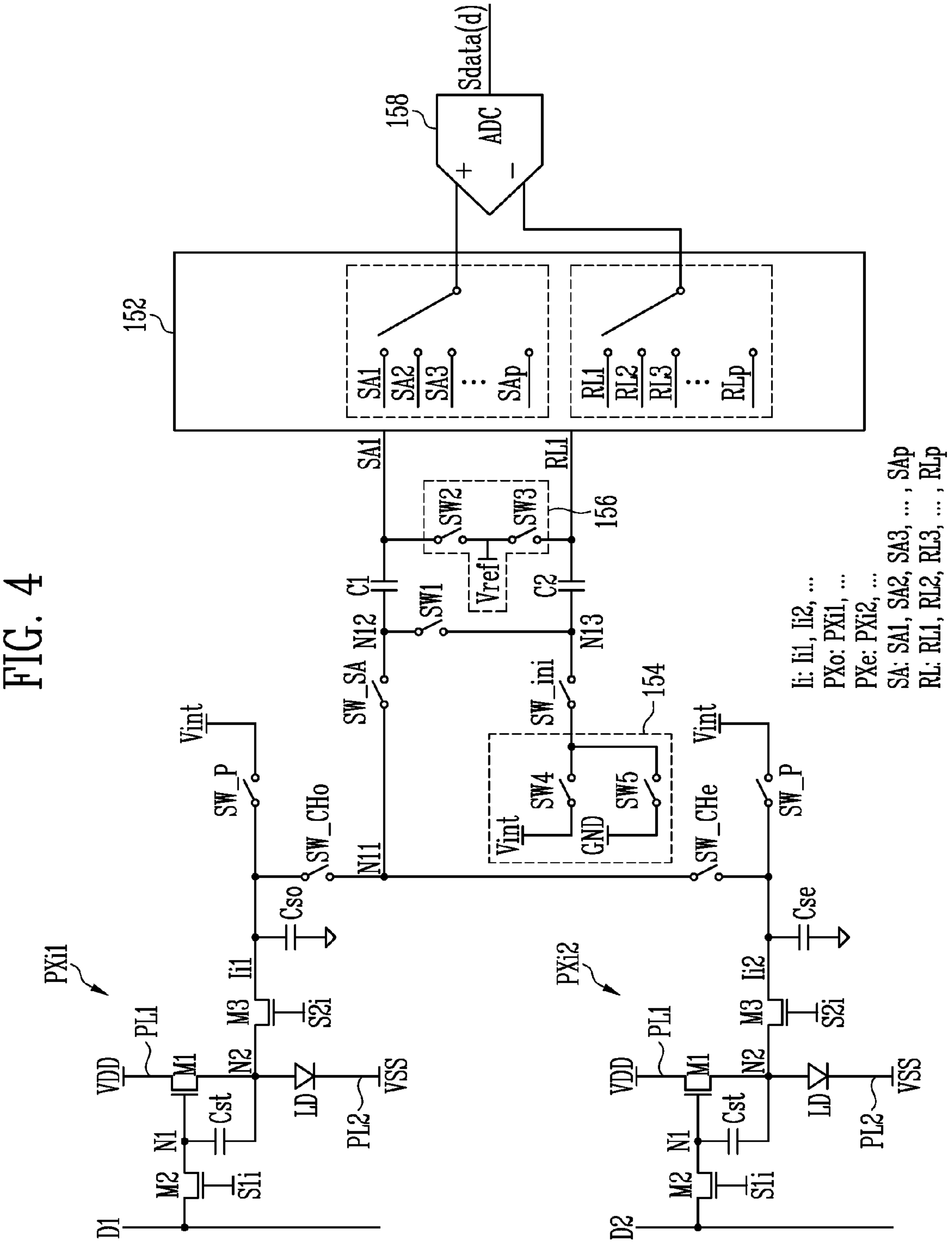
FIG. 4 is a diagram illustrating a sensing channel of a sensing component in accordance with an embodiment of the present disclosure.

FIG. 4 is a diagram illustrating a sensing channel of a sensing component in accordance with an embodiment of the present disclosure. FIG. 4 illustrates a sensing channel connected to a first sub-sensing line Ii1 and a second sub-sensing line Ii2 that are located in an i-th pixel row. The first sub-sensing line Ii1 may be electrically connected to a first pixel PXi1 connected to a first data line D1 (e.g., an odd-numbered pixel column). The second sub-sensing line Ii2 may be electrically connected to a second pixel PXi2 connected to a second data line D2 (e.g., an even-numbered pixel column).

Referring to FIG. 4, the sensing channel in accordance with an embodiment of the present disclosure may include a panel switch SW_P connected between each of the sub-sensing lines Ii1 and Ii2 and the initialization power supply Vint. The panel switch SW_P may remain turned on during a display period.

The sensing channel in accordance with an embodiment of the present disclosure may include a first sensing capacitor Cso connected between the first sub-sensing line Ii1 and a base voltage supply, and a second sensing capacitor Cse connected between the second sub-sensing line Ii2 and a base voltage supply. The first sensing capacitor Cso may store a first sensing voltage supplied from the first pixel PXi1. The second sensing capacitor Cse may store a second sensing voltage supplied from the second pixel PXi2.

The sensing channel in accordance with an embodiment of the present disclosure may include a first channel switch SW_CHo connected between the first sub-sensing line Ii1 and an eleventh node N11, and a second channel switch SW_CHe connected between the second sub-sensing line Ii2 and the eleventh node N11. The first channel switch SW_CHo may be connected between the first sub-sensing line Ii1 and a sampling switch SW_SA. The first channel switch SW_CHo may remain turned on when the first pixels PXo positioned in the odd-numbered pixel column are sensed.

The second channel switch SW_CHe may be connected between the second sub-sensing line Ii2 and the sampling switch SW_SA. The second channel switch SW_CHe may remain turned on when the second pixels PXe positioned in the even-numbered pixel column are sensed.

The sensing channel in accordance with an embodiment of the present disclosure may include the sampling switch SW_SA connected between the eleventh node N11 and a twelfth node N12, a first capacitor C1 connected between the twelfth node N12 and a sampling line SA1, a first switch SW1 between the twelfth node N12 and a thirteenth node N13, a second capacitor C2 connected between the thirteenth node N13 and a reference line RL1, an initialization switch SW_ini connected between a first initialization component 154 and the thirteenth node N13, and a second initialization component 156 connected between the sampling line SA1 and the reference line RL1.

The sampling switch SW_SA may be turned on during a period in which the first sensing voltage and the second sensing voltage are transmitted to the twelfth node N12. The first sensing voltage from the first sensing capacitor Cso or the second sensing voltage from the second sensing capacitor Cse may be supplied to the first capacitor C1 in response to the turn-on of the sampling switch SW_SA.

The initialization switch SW_ini may be turned on when the thirteenth node N13 is initialized. In an embodiment, for example, the initialization switch SW_ini may be turned on or turned off simultaneously with the sampling switch SW_SA.

The first capacitor C1 may control a voltage of the sampling line SA1 based on the voltage of the twelfth node N12. In an embodiment, for example, the first capacitor C1 may function as a coupling capacitor and control the voltage of the sampling line SA1 in response to changes in the voltage of the twelfth node N12.

The second capacitor C2 may control the voltage of the reference line RL1 in response to the voltage of the thirteenth node N13. In an embodiment, for example, the second capacitor C2 may function as a coupling capacitor and control the voltage of the reference line RL1 in response to changes in the voltage of the thirteen node N13.

The first switch SW1 may be turned on during a period in which the twelfth node N12 and the thirteenth N13 are initialized. A turn-on period of the first switch SW1 may partially overlap a turn-on period of the sampling switch SW_SA.

The first initialization component 154 may include a fourth switch SW4 connected between the initialization power supply Vint and the initialization switch SW_ini, and a fifth switch SW5 connected between the ground potential supply GND and the initialization switch SW_ini. The fourth switch SW4 or the fifth switch SW5 may remain turned on during the sensing period. In the following description, for the sake of clarity, it is assumed that the fourth switch SW4 remains turned on during the sensing period. In this case, the fifth switch SW5 may be omitted.

The second initialization component 156 may include a second switch SW2 connected between the reference power supply Vref and the sampling line SA1, and a third switch SW3 connected between the reference power supply Vref and the reference line RL1. The second switch SW2 and the third switch SW3 may be simultaneously turned on or turned off, and may be turned on during a period in which the sampling line SA1 and the reference line RL1 are initialized. A turn-on period of the second switch SW2 and the third switch SW3 may partially overlap the turn-on period of the sampling switch SW_SA. The reference power supply Vref may be set to the same voltage as the initialization power supply Vint. In the following description, for the sake of clarity, it is assumed that the reference power supply Vref is set to the same voltage as the initialization power supply Vint.

The sensing channel may be shared by the first sub-sensing line Ii1 and the second sub-sensing line Ii2 that are positioned adjacent to each other. In other words, the other sensing channels that are not illustrated in FIG. 4 may also be shared by the first sub-sensing lines and the second sub-sensing lines that are positioned adjacent to each other. The structure of the other sensing channels may be the same as the sensing channel depicted in FIG. 4.

The multiplexer 152 (that is, a switch matrix) may be shared by a plurality of sensing channels. The multiplexer 152 may sequentially connect a plurality of sensing channels to an analog-digital converter (hereinafter, referred to as "ADC") 158. In an embodiment, for example, the multiplexer 152 may sequentially connect one of the sampling lines SA1, SA2, SA3, . . . , and Sap included in the sensing channels (where "p" is a natural number of "m" or less") and one of the reference lines RL1, RL2, RL3, . . . , and RLp to the ADC 158.

The ADC 158 may convert a sampling voltage supplied from the sampling line SA to a digital value, based on a voltage (e.g., the voltage of the initialization power supply Vint) supplied from the reference line RL. The digital value outputted from the ADC 158 may be supplied to the timing controller 11 as sensing data Sdata(d).

Figure 5:
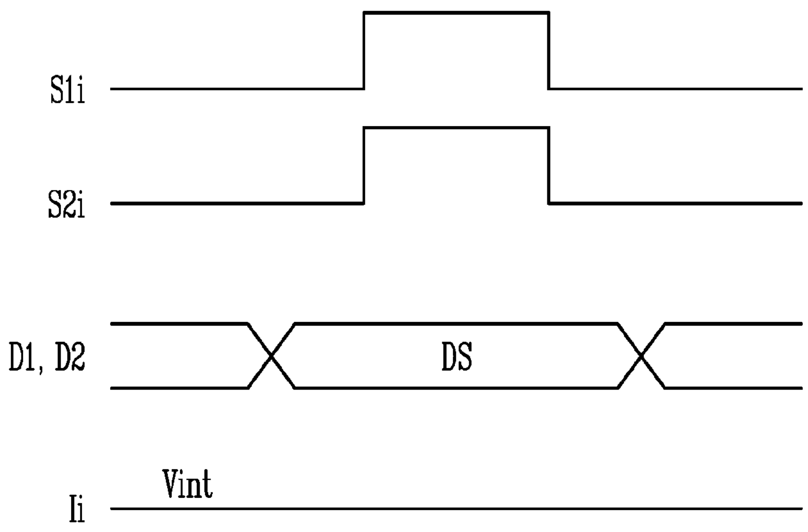
FIG. 5 is a waveform diagram illustrating an embodiment of a driving waveform to be supplied during a display period.
Figure 6:
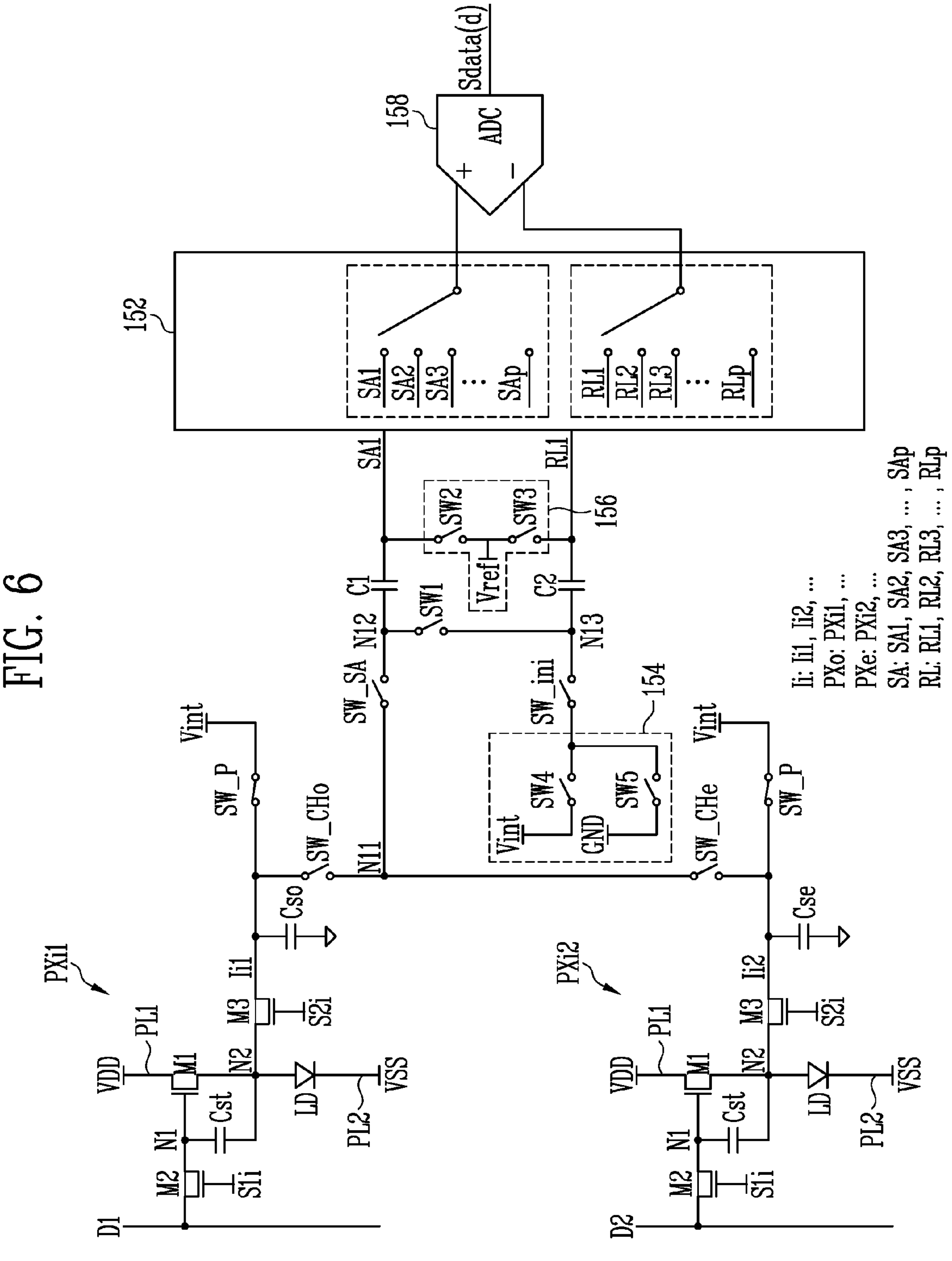
FIG. 6 is a diagram illustrating an operation process of the sensing component during the display period.

FIG. 5 is a waveform diagram illustrating an embodiment of a driving waveform to be supplied during a display period. FIG. 6 is a diagram illustrating an operation process of the sensing component during the display period.

Referring to FIGS. 5 and 6, the panel switch SW_P remains turned on during the display period. If the panel switch SW_P is set to a turn-on state, the voltage of the initialization power supply Vint is supplied to the sub-sensing lines Ii1 and Ii2. During the display period, the panel switches SW_P included in all of the sensing channels may be set to the turn-on state, thus allowing the sensing line Ii to receive the voltage of the initialization power supply Vint.

During the display period, a first scan signal is supplied to the first scan line S1*i*, and a second scan signal is supplied to the second scan line S2*i*.

If the first scan signal is supplied to the first scan line S1*i*, the second transistor M2 is turned on. If the second transistor M2 is turned on, data signals DS are supplied from the data lines D1 and D2 to the first node N1. In an embodiment, for example, the first pixel PXi1 may be supplied with a data signal from the first data line D1, and the second pixel PXi2 may be supplied with a data signal from the second data line D2.

If the second scan signal is supplied to the second scan line S2*i*, the third transistor M3 is turned on. If the third transistor M3 is turned on, the voltage of the initialization power source Vint is supplied from the sensing line Ii to the second node N2. Here, a voltage corresponding to a difference between the voltage of the data signal DS and the voltage of the initialization power supply Vint may be stored in the storage capacitor Cst.

After a voltage corresponding to the data signal DS is stored in the storage capacitor Cst, the supply of the first scan signal to the first scan line S1*i* is interrupted, thus causing the second transistor M2 to be turned off, and the supply of the second scan signal to the second scan line S2*i* is interrupted, thus causing the third transistor M3 to be turned off. Thereafter, the first transistor M1 may supply current corresponding to the voltage stored in the storage capacitor Cst to the light emitting element LD. The luminance of the light emitting element LD may be determined in response to the amount of current supplied from the first transistor M1 to the light emitting element LD.

Figure 7:
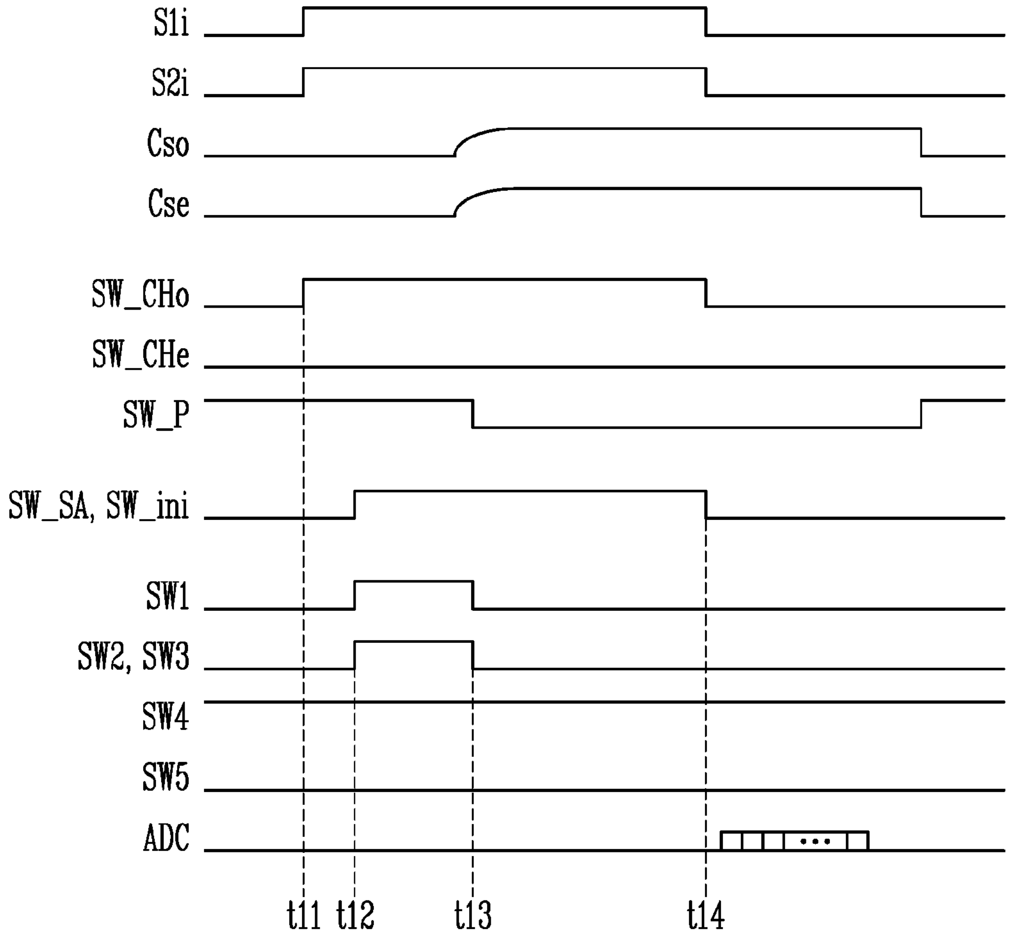
FIG. 7 is a diagram illustrating an embodiment of a driving waveform to be supplied during a normal sensing period of first pixels.
Figure 8A:
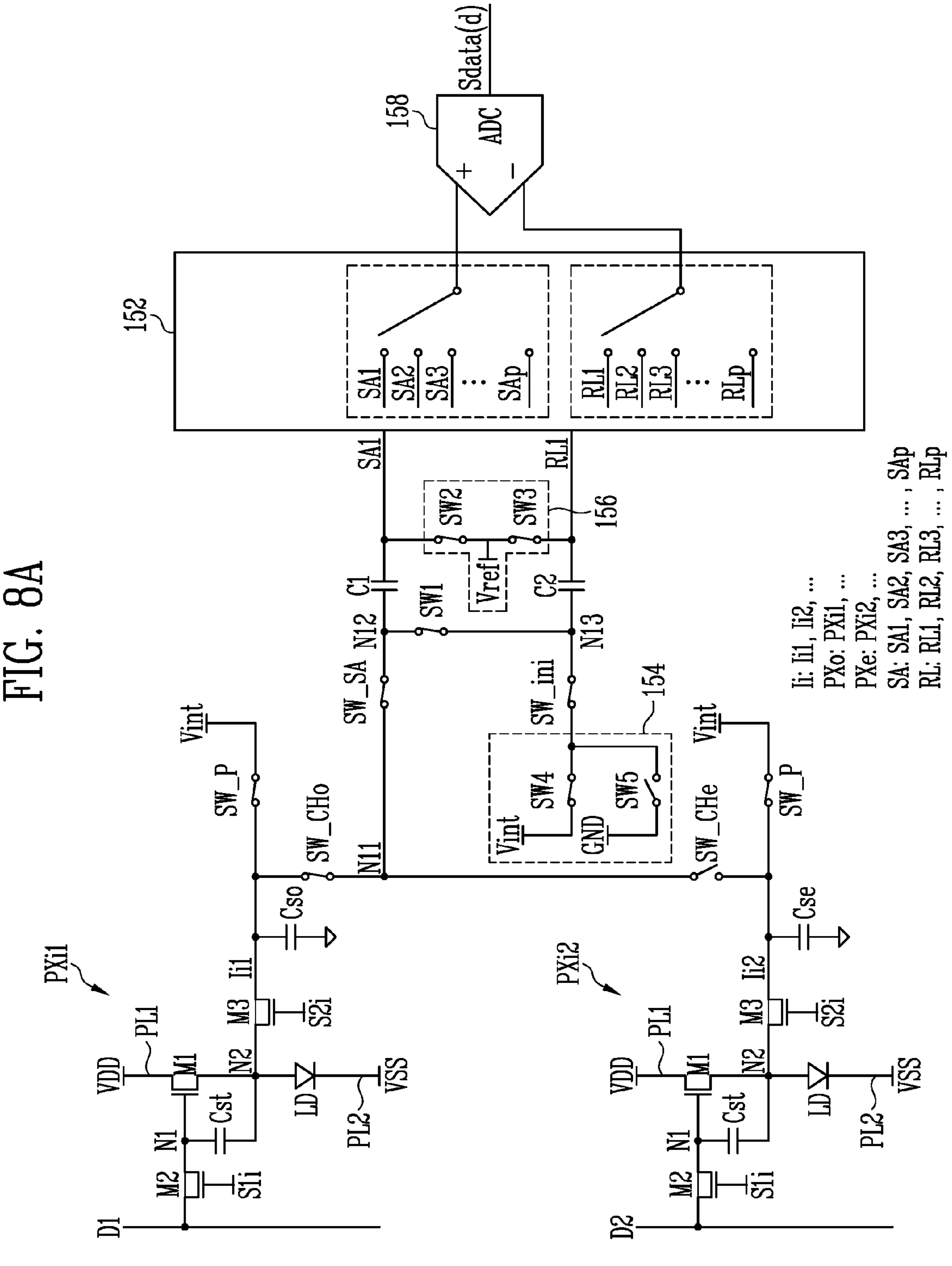
FIGS. 8A to 8C are diagrams illustrating a process of generating sensing data during a normal sensing period of the first pixels.
Figure 8B:
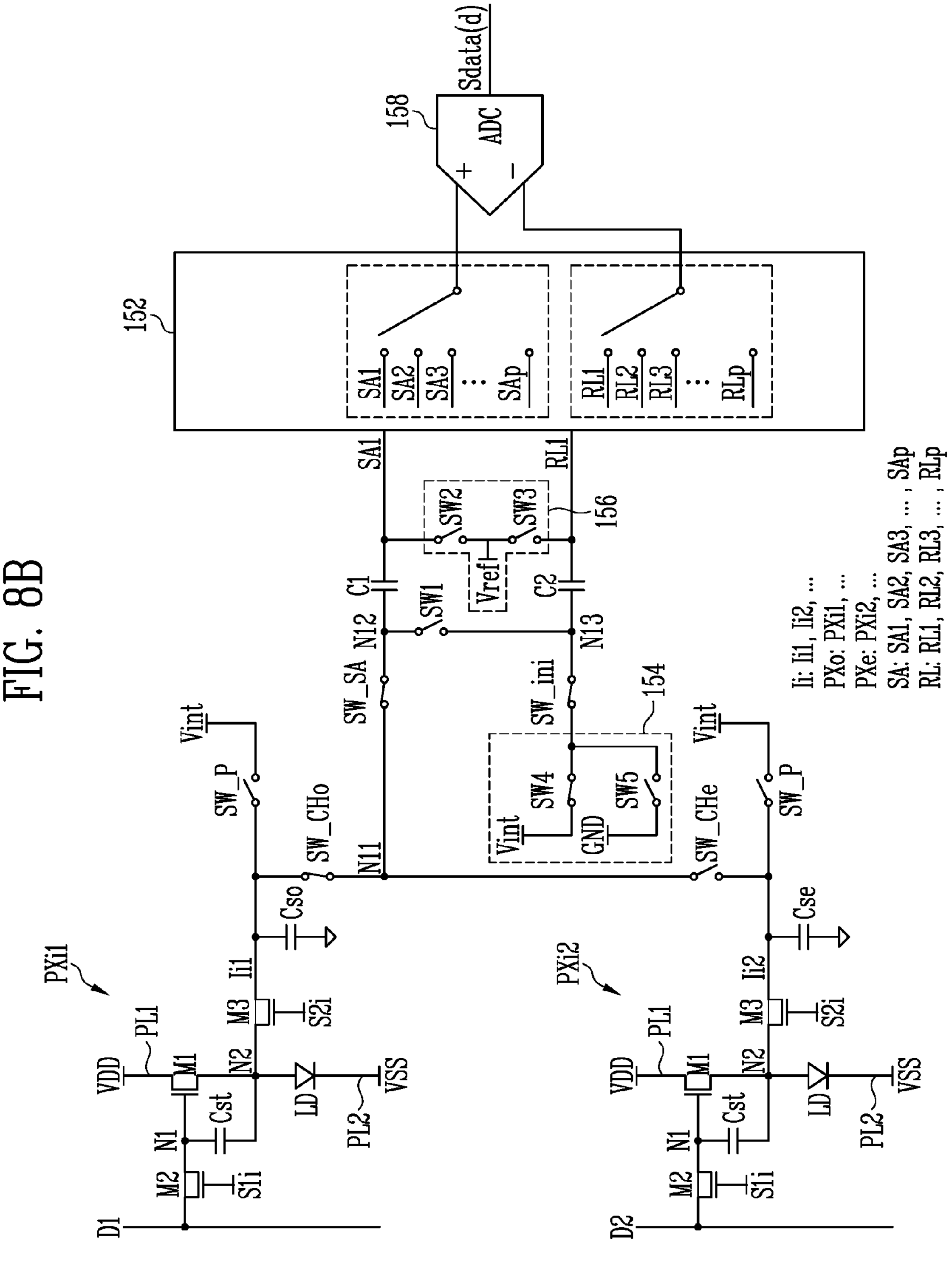
Figure 8C:
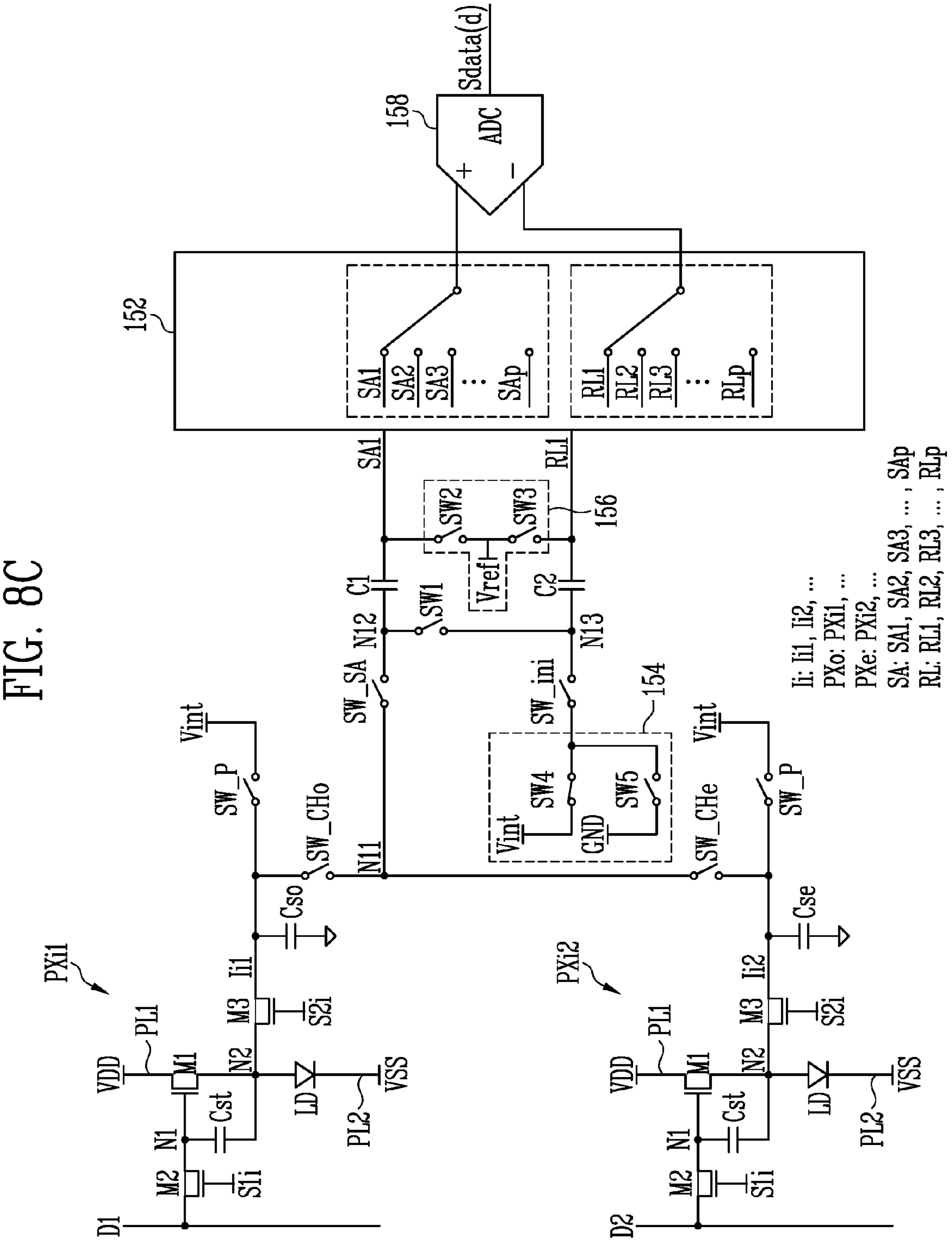

FIG. 7 is a diagram illustrating an embodiment of a driving waveform to be supplied during a normal sensing period of the first pixels. FIGS. 8A to 8C are diagrams illustrating a process of generating sensing data during a normal sensing period of the first pixels (that is, during a first normal sensing period). The normal sensing period of the first pixels PXo may refer to a period in which sensing data is generated from only the first pixels PXo except for the second pixels PXe during the sensing period.

Referring to FIG. 7, during the first normal sensing period, the fourth switch SW4 may remain turned on, and the fifth switch SW5 may remain turned off. If the fourth switch SW4 is turned on, the voltage of the initialization power supply Vint may be supplied to the initialization switch SW_ini.

During the first normal sensing period, at a first time point t11, a first scan signal is supplied to the first scan line S1*i*, and a second scan signal is supplied to the second scan line S2*i*. At the first time point t11, the first channel switch SW_CHo is turned on, and the panel switch SW_P remains turned on.

If the panel switch SW_P remains turned on, the voltage of the initialization power supply Vint is supplied to the sensing line Ii. If the first scan signal is supplied to the first scan line S1*i*, the second transistor M2 is turned on. If the second transistor M2 is turned on, a certain voltage is supplied from the data lines D1 and D2 to the first nodes N1 of the first pixel PXi1 and the second pixel PXi2. The certain voltage may be set as a voltage that allows the first transistor M1 to be turned on.

If the second scan signal is supplied, the third transistor M3 is turned on. If the third transistor M3 is turned on, the voltage of the initialization power supply Vint is supplied from the sensing line Ii to the second nodes N2 of the first pixel PXi1 and the second pixel PXi2. Here, a voltage corresponding to a difference between the certain voltage and the voltage of the initialization power supply Vint may be stored in the storage capacitor Cst.

If the first channel switch SW_CHo is turned on, the voltage of the initialization power supply Vint may be supplied to the eleventh node N11.

At a second time point t12, as illustrated in FIG. 8A, the sampling switch SW_SA, the initialization switch SW_ini, the first switch SW1, the second switch SW2, and the third switch SW3 are turned on.

If the initialization switch SW_ini, the first switch SW1, and the sampling switch SW_SA are turned on, the voltage of the initialization power supply Vint is supplied to the thirteenth node N13, the twelfth node N12, and the eleventh node N11 so that the thirteenth node N13, the twelfth node N12, and the eleventh node N11 may be initialized to the voltage of the initialization power supply Vint.

If the second switch SW2 and the third switch SW3 are turned on, the voltage of the reference power supply Vref (or the initialization power supply Vint) is supplied to the sampling line SA1 and the reference line RL1. Then, the sampling line SA1 and the reference line RL1 are initialized to the voltage of the reference power supply Vref.

During a period between the second time point t12 and a third time point t13, the first capacitor C1 and the second capacitor C2 may be initialized by the voltage of the initialization power supply Vint and the reference power supply Vref. In an embodiment, for example, the reference power supply Vref may be set to the same voltage as the initialization power supply Vint, thus allowing the voltage charged to the first capacitor C1 and the second capacitor C2 during the previous period to be discharged.

At the third time point t13, as illustrated in FIG. 8B, the panel switch SW_P, the first switch SW1, the second switch SW2, and the third switch SW3 are turned off. If the second switch SW2 is turned off, the sampling line SA1 may be set to a floating state. As a result, the voltage of the sampling line SA1 may be changed due to the coupling of the first capacitor C1.

If the third switch SW3 is turned off, the reference line RL1 may be set to a floating state. As a result, the voltage of the reference line RL1 may be changed due to the coupling of the first capacitor C2. Here, because the fourth switch SW4 and the initialization switch SW_ini remain turned on, the thirteenth node N13 may be maintained at the voltage of the initialization power supply Vint. Hence, the reference line RL1 may be maintained at the voltage of the reference power supply Vref.

If the panel switch SW_P is turned off, a first sensing voltage corresponding to the certain voltage may be stored in the first sensing capacitor Cso. The threshold voltage and/or mobility information of the first transistor M1 included in the first pixel PXi1 may be included in the first sensing voltage.

Likewise, if the panel switch SW_P is turned off, a second sensing voltage corresponding to the certain voltage may be stored in the second sensing capacitor Cse. The threshold voltage and/or mobility information of the first transistor M1 included in the second pixel PXi2 may be included in the second sensing voltage. During the first normal sensing period, the second sensing voltage stored in the second sensing capacitor Cse is not supplied to the ADC 158.

Because the first channel switch SW_CHo and the sampling switch SW_SA are set to a turn-on state during a period between the third time point t13 and a fourth time point t14, the voltage of the twelfth node N12 is increased by the first sensing voltage. If the voltage of the twelfth node N12 increases, the voltage of the sampling line SA1 may be increased due to the coupling of the first capacitor C1. In other words, the voltage of the sampling line SA1 is increased by the first sensing voltage, and as a result, the threshold voltage and/or mobility information of the first transistor M1 included in the first pixel PXi1 may be included in the voltage of the sampling line SA1.

At the fourth time point t14, as illustrated in FIG. 8C, the first channel switch SW_CHo, the sampling switch SW_SA, and the initialization switch SW_ini are turned off. Thereafter, the multiplexer 152 may sequentially connect the sampling lines SA1 to SAp to the ADC 158, and may sequentially connect the reference lines RL1 to RLp to the ADC 158.

In this case, the ADC 158 may sequentially generate sensing data Sdata(d) corresponding to the voltages of the sampling lines SA1 to SAp connected thereto, which represent the first sensing voltage. In other words, the ADC 158 may sequentially generate sensing data Sdata(d) corresponding to the first sensing voltage from the first pixels PXo located in the i-th pixel row.

In the case where the first normal sensing period described above is repeated for the entire pixel rows included in the pixel component 14, the sensing data Sdata (d) corresponding to all of the first pixels PXo included in the pixel component 14 may be generated.

Figure 9:
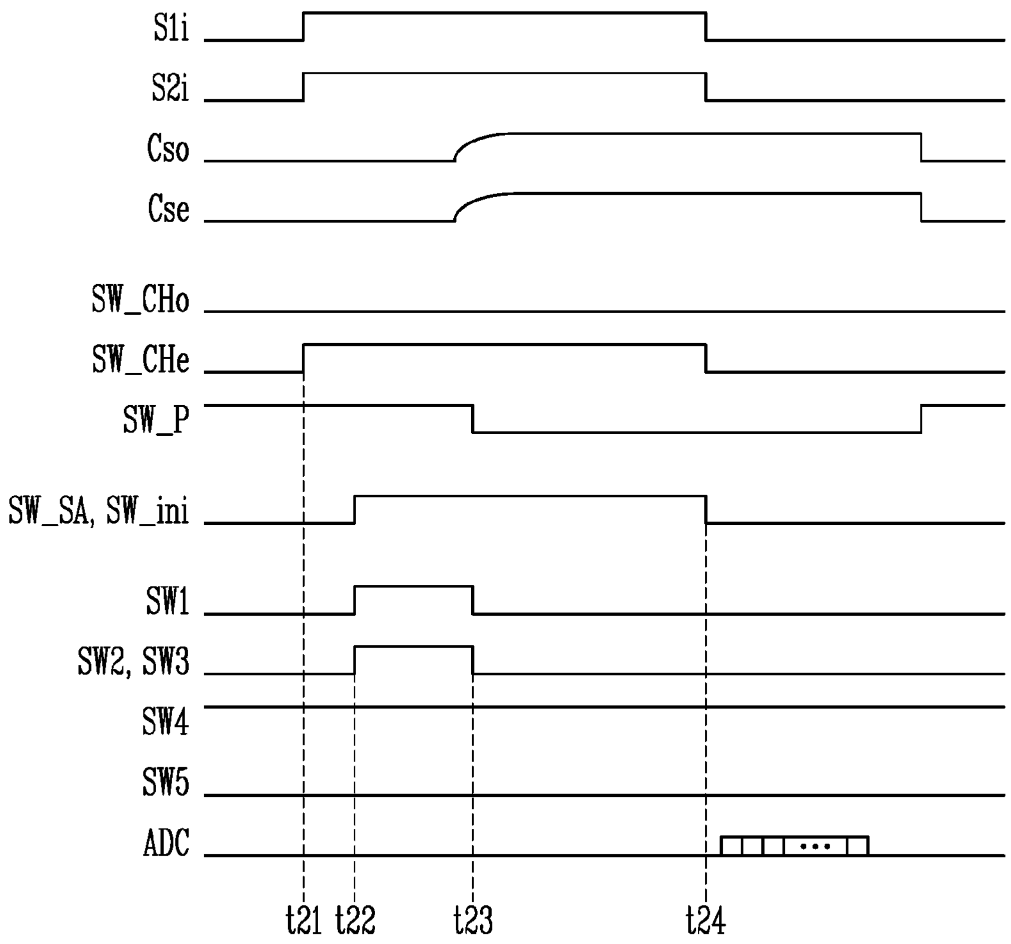
FIG. 9 is a diagram illustrating an embodiment of a driving waveform to be supplied during a normal sensing period of second pixels.

FIG. 9 is a diagram illustrating an embodiment of a driving waveform to be supplied during a normal sensing period of the second pixels PXe. The normal sensing period (that is, a second normal sensing period) of the second pixels PXe may refer to a period in which sensing data is generated from the second pixels PXe except for the first pixels PXo during the sensing period. In the following description of FIG. 9, redundant explanation pertaining to the same configuration as that of FIG. 7 will be briefly mentioned.

Referring to FIGS. 4 and 9, during the second normal sensing period, the fourth switch SW4 may remain turned on, and the fifth switch SW5 may remain turned off.

During the normal sensing period, at a first time point t21, a first scan signal is supplied to the first scan line S1*i*, and a second scan signal is supplied to the second scan line S2*i*. At the first time point t21, the second channel switch SW_CHe is turned on, and the panel switch SW_P remains turned on.

At a second time point t22, the sampling switch SW_SA, the initialization switch SW_ini, the first switch SW1, the second switch SW2, and the third switch SW3 are turned on.

If the initialization switch SW_ini, the first switch SW1, and the sampling switch SW_SA are turned on, the thirteenth node N13, the twelfth node N12, and the eleventh node N11 may be initialized to the voltage of the initialization power supply Vint. If the second switch SW2 and the third switch SW3 are turned on, the sampling line SA1 and the reference line RL1 are initialized to the voltage of the reference power supply Vref.

At a third time point t23, the panel switch SW_P, the first switch SW1, the second switch SW2, and the third switch SW3 are turned off.

If the panel switch SW_P is turned off, a second sensing voltage corresponding to the certain voltage may be stored in the second sensing capacitor Cse. The threshold voltage and/or mobility information of the first transistor M1 included in the second pixel PXi2 may be included in the second sensing voltage.

Likewise, if the panel switch SW_P is turned off, a first sensing voltage corresponding to the certain voltage may be stored in the first sensing capacitor Cso. The threshold voltage and/or mobility information of the first transistor M1 included in the first pixel PXi1 may be included in the first sensing voltage. During the second normal sensing period, the first sensing voltage stored in the first sensing capacitor Cso is not supplied to the ADC 158.

Because the second channel switch SW_CHe and the sampling switch SW_SA are set to a turn-on state during a period between the third time point t23 and a fourth time point t24, the voltage of the twelfth node N12 is increased by the second sensing voltage. If the voltage of the twelfth node N12 increases, the voltage of the sampling line SA1 may be increased due to the coupling of the first capacitor C1. In other words, the voltage of the sampling line SA1 is increased by the second sensing voltage, and as a result, the threshold voltage and/or mobility information of the first transistor M1 included in the second pixel PXi2 may be included in the voltage of the sampling line SA1.

At the fourth time point t24, the second channel switch SW_CHe, the sampling switch SW_SA, and the initialization switch SW_ini are turned off. Thereafter, the multiplexer 152 may sequentially connect the sampling lines SA1 to SAp to the ADC 158, and may sequentially connect the reference lines RL1 to RLp to the ADC 158.

In this case, the ADC 158 may sequentially generate sensing data Sdata(d) corresponding to the voltages of the sampling lines SA1 to SAp connected thereto, which represent the second sensing voltage. In an embodiment, for example, the ADC 158 may sequentially generate sensing data Sdata(d) corresponding to the second sensing voltage from the second pixels PXe located in the i-th pixel row.

In the case where the second normal sensing period described above is repeated for the entire pixel rows included in the pixel component 14, the sensing data Sdata (d) corresponding to all of the second pixels PXe included in the pixel component 14 may be generated.

Figure 10A:
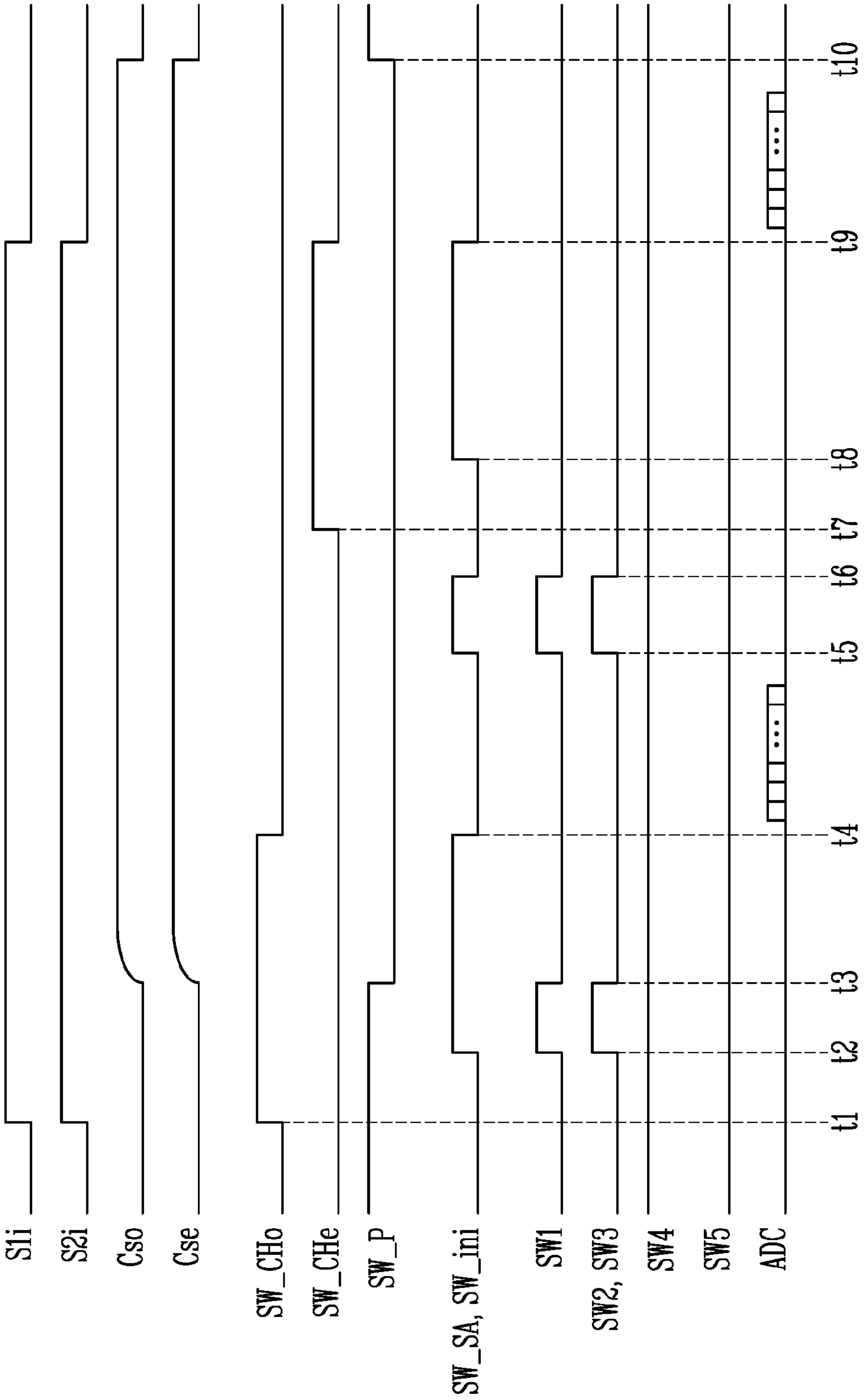
FIGS. 10A and 10B are diagrams illustrating an embodiment of a driving waveform to be supplied during a divided sensing period.
Figure 10B:
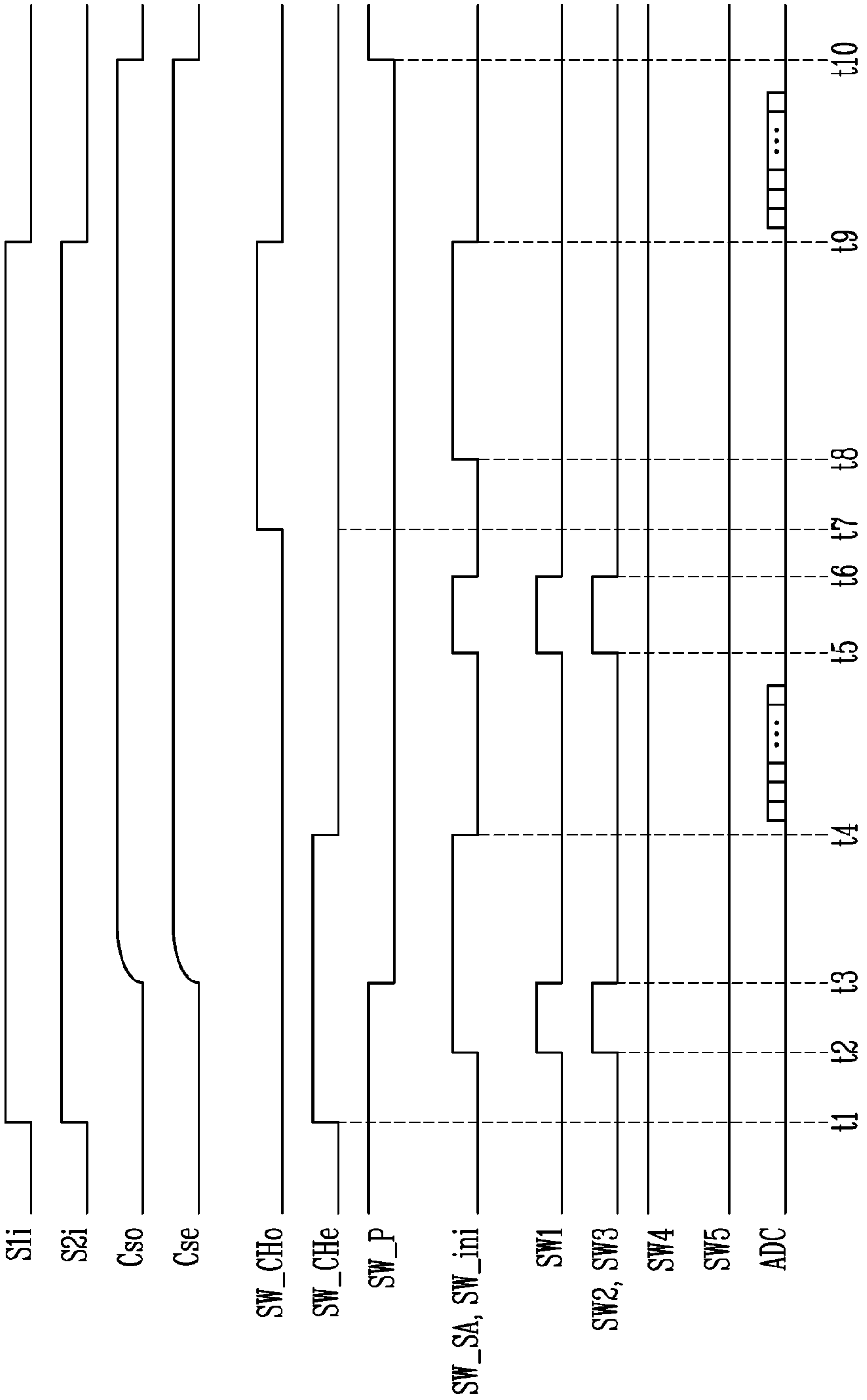

FIGS. 10A and 10B are diagrams illustrating an embodiment of a driving waveform to be supplied during a divided sensing period. FIGS. 11A to 11D are diagrams illustrating a process of generating sensing data from the second pixels PXe during the divided sensing period. The divided sensing period may refer to a period in which sensing data of the first pixels PXo and the second pixels PXe are sequentially generated during a single sensing period.

FIG. 10A illustrates the case where the first pixels PXo are sensed during a first sensing period (e.g., a period from t1 to t5) within the divided sensing period, and the second pixels PXe are sensed during a second sensing period (e.g., a period from t5 to t10). FIG. 10B illustrates the case where the second pixels PXe are sensed during the first sensing period within the divided sensing period, and the first pixels PXo are sensed during the second sensing period.

In the case of FIG. 10B, a driving method is the same as FIG. 10A, with the exception that the second channel switch SW_CHe is turned on during the first sensing period, and the first channel switch SW_CHo is turned on during the second sensing period. In the following description, an operation process will be described with reference to FIG. 10A.

Referring to FIG. 10A, during the first sensing period, the ADC 158 may sequentially generate sensing data Sdata(d) corresponding to the first sensing voltage from the first pixels PXo located in the i-th pixel row. A detailed operation process pertaining thereto is the same as FIG. 7; therefore redundant explanation thereof will be omitted.

Figure 11A:
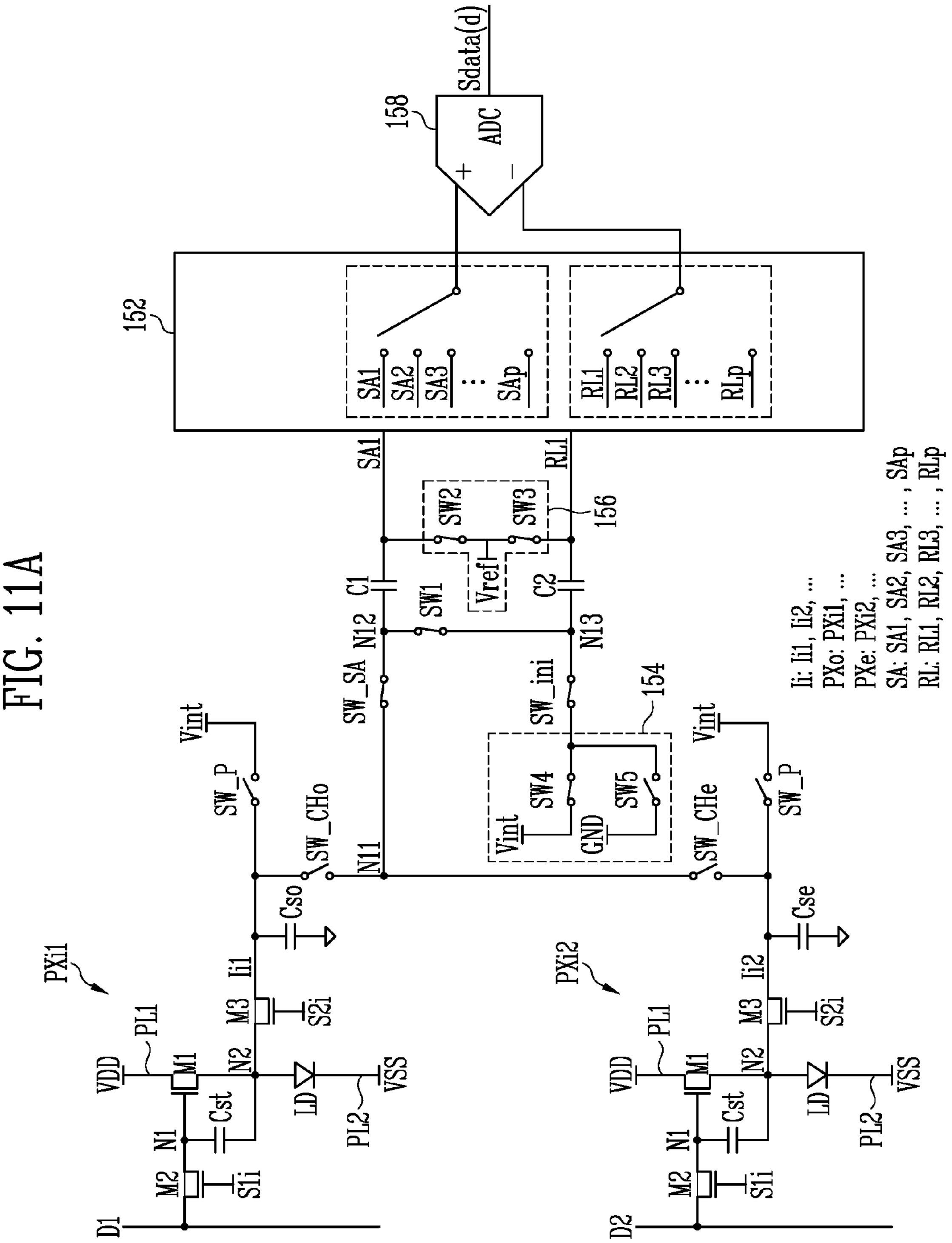
FIGS. 11A to 11D are diagrams illustrating a process of generating sensing data from the second pixels during the divided sensing period.

During the second sensing period, at a fifth time point t5, as illustrated in FIG. 11A, the sampling switch SW_SA, the initialization switch SW_ini, the first switch SW1, the second switch SW2, and the third switch SW3 are turned on.

If the initialization switch SW_ini, the first switch SW1, and the sampling switch SW_SA are turned on, the voltage of the initialization power supply Vint is supplied to the thirteenth node N13, the twelfth node N12, and the eleventh node N11 so that the thirteenth node N13, the twelfth node N12, and the eleventh node N11 may be initialized.

If the second switch SW2 and the third switch SW3 are turned on, the voltage of the reference power supply Vref (or the initialization power supply Vint) is supplied to the sampling line SA1 and the reference line RL1. Then, the sampling line SA1 and the reference line RL1 are initialized to the voltage of the reference power supply Vref.

At a sixth time point t6, the sampling switch SW_SA, the initialization switch SW_ini, the first switch SW1, the second switch SW2, and the third switch SW3 are turned off.

Figure 11B:
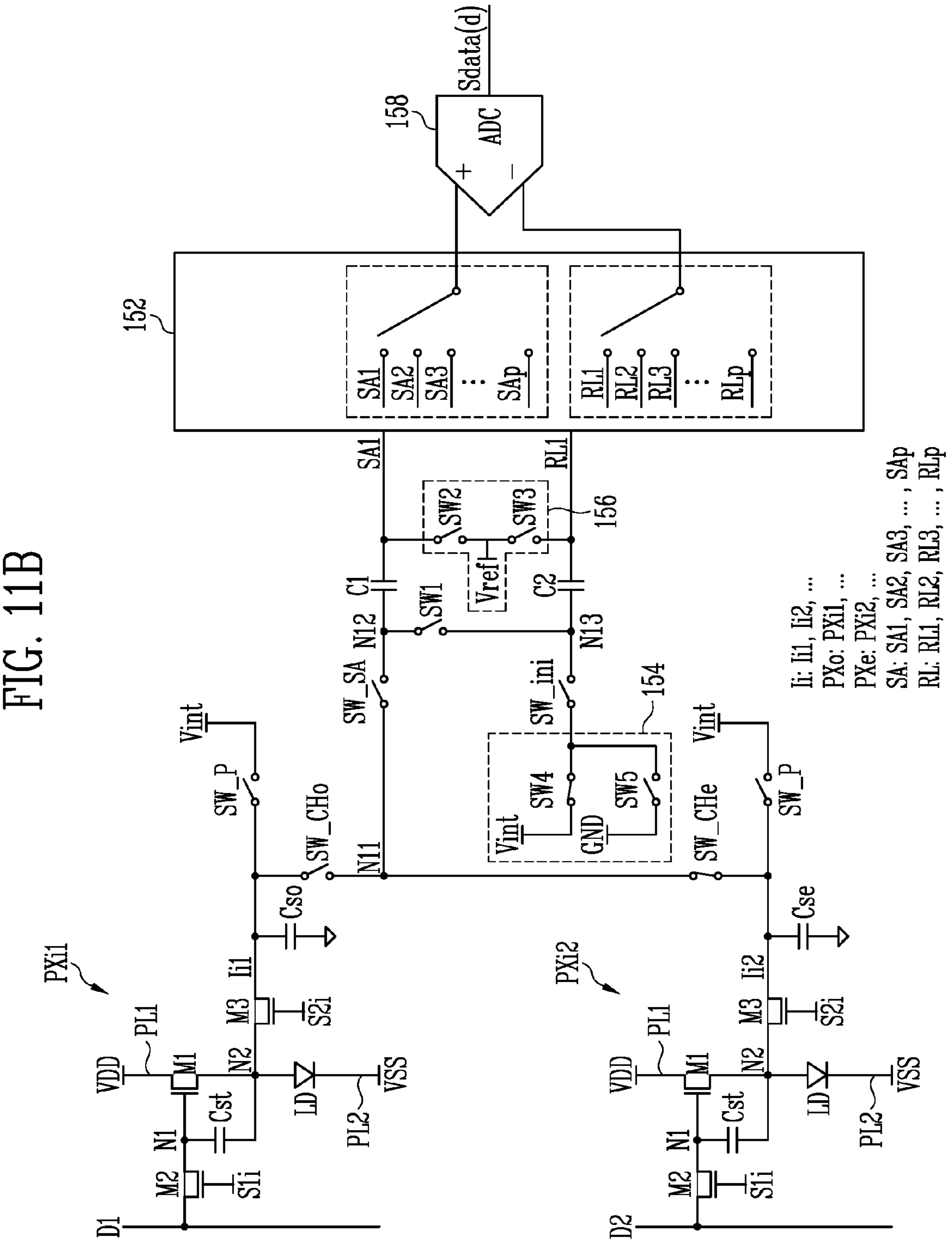

At a seventh time point t7, as illustrated in FIG. 11B, the second channel switch SW_CHe is turned on. If the second channel switch SW_CHe is turned, the second sensing capacitor Cse may be electrically connected to the eleventh node N11.

Figure 11C:
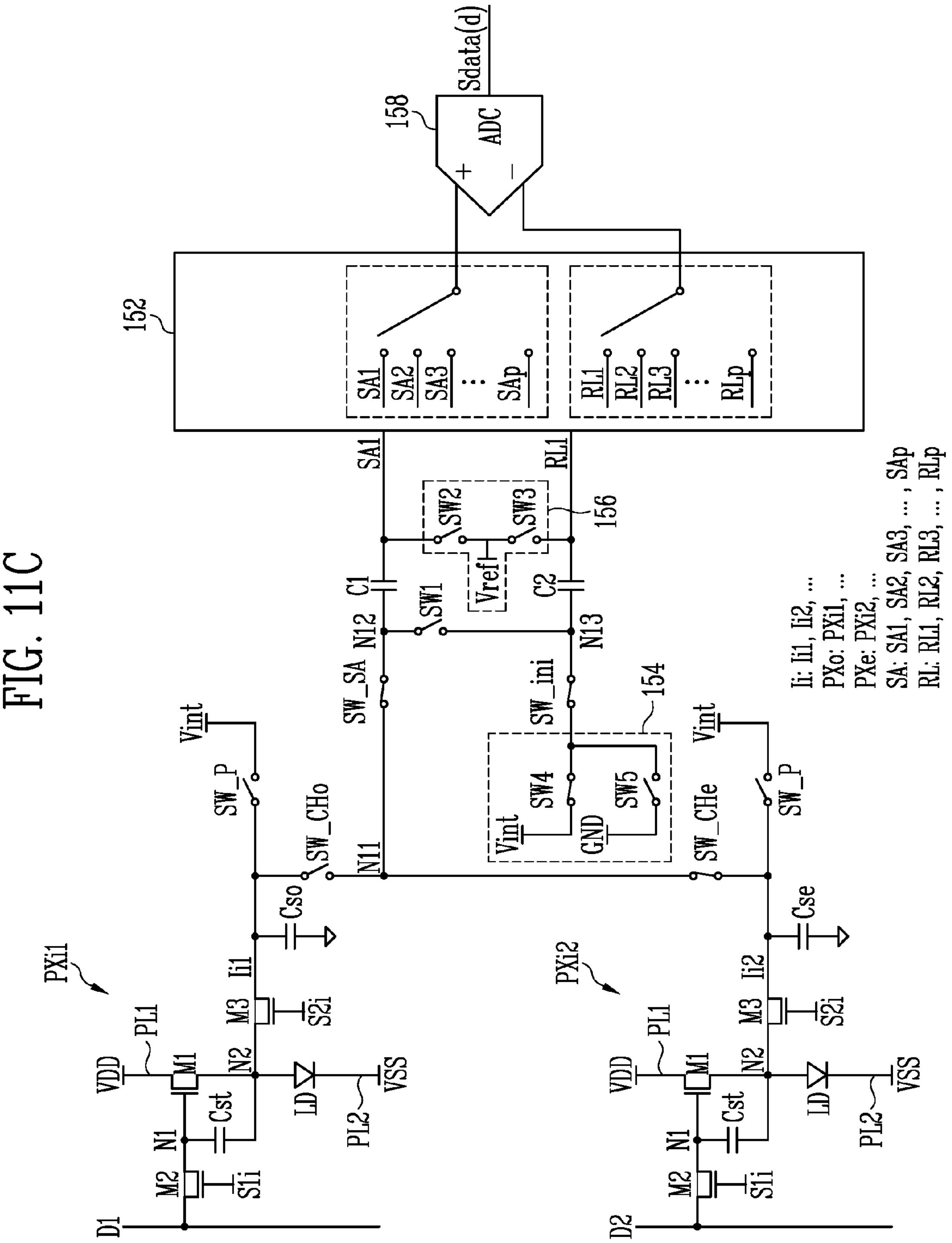

At an eighth time point t8, as illustrated in FIG. 11C, the sampling switch SW_SA and the initialization switch SW_ini are turned on. If the initialization switch SW_ini is turned on, the voltage of the initialization power supply Vint may be supplied to the thirteenth node N13, and the reference line RL1 may be maintained at the voltage of the reference power supply Vref.

If the sampling switch SW_SA is turned on, the voltage of the twelfth node N12 is increased by the second sensing voltage of the second sensing capacitor Cse. If the voltage of the twelfth node N12 increases, the voltage of the sampling line SA1 may also be increased due to the coupling of the first capacitor C1. In other words, the voltage of the sampling line SA1 is changed by the second sensing voltage, and as a result, the threshold voltage and/or mobility information of the first transistor M1 included in the second pixel PXi2 may be included in the voltage of the sampling line SA1.

Figure 11D:
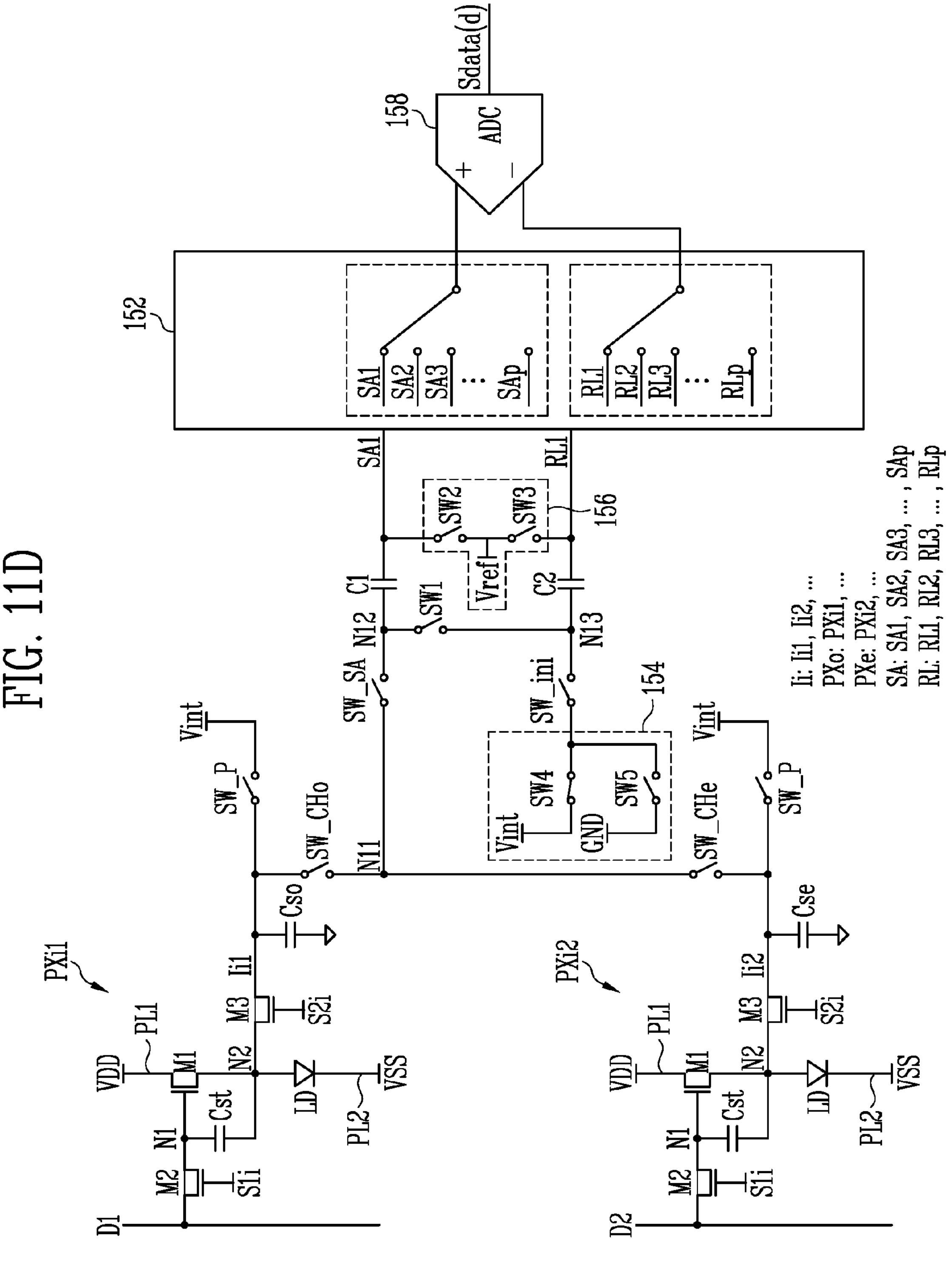

At a ninth time point t9, as illustrated in FIG. 11D, the sampling switch SW_SA and the initialization switch SW_ini are turned off. Thereafter, during a period between the ninth time point t9 and the tenth time point t10, the multiplexer 152 may sequentially connect the sampling lines SA1 to SAp to the ADC 158, and may sequentially connect the reference lines RL1 to RLp to the ADC 158.

In this case, the ADC 158 may sequentially generate sensing data Sdata(d) corresponding to the voltages of the sampling lines SA1 to SAp connected thereto, which represent the second sensing voltage. In other words, the ADC 158 may sequentially generate sensing data Sdata(d) corresponding to the second sensing voltage from the second pixels PXe located in the i-th pixel row.

In the divided sensing period described above, the second sensing voltage charged to the second sensing capacitor Cse during the first sensing period may be used in the second sensing period. In this case, after first sensing data Sdata(o) (refer to FIG. 13) is generated from the first pixels PXo, second sensing data Sdata(e) (refer to FIG. 13) may be sequentially generated from the second pixels PXe. Hence, the sensing period may be reduced.

Here, in the case where the first sensing data Sdata(o) and the second sensing data Sdata(e) are successively generated during the divided sensing period, a deviation in characteristics between the first sensing data Sdata(o) and the second sensing data Sdata(e) may be caused.

In detail, during a period (from t3 to t4) in which the first sensing voltage is charged and supplied to the first sensing capacitor Cso, the sampling switch SW_SA remains turned on. On the other hand, during the second sensing period, the sampling switch SW_SA is set to a turn-on state after the second sensing voltage is charged to the second sensing capacitor Cse. In other words, the process of supplying the first sensing voltage to the twelfth node N12 and the process of supplying the second sensing voltage to the twelfth node N12 are set to be different from each other, resulting in sensing deviations.

In addition, during the first normal sensing period, the sampling switch SW_SA also remains turned on during a period (from t13 to t14) in which the first sensing voltage is charged and supplied to the first sensing capacitor Cso, in the same manner as that in the first sensing period. Furthermore, during the second normal sensing period, the sampling switch SW_SA also remains turned on during a period (from t23 to t24) in which the second sensing voltage is charged and supplied to the second sensing capacitor Cse, in the same manner as that in the first sensing period. Consequently, the second sensing data Sdata(e) may have sensing deviations compared to normal sensing data Sdata(n) (refer to FIG. 13) and the first sensing data Sdata(o) which are generated during the normal sensing period.

Figure 12:
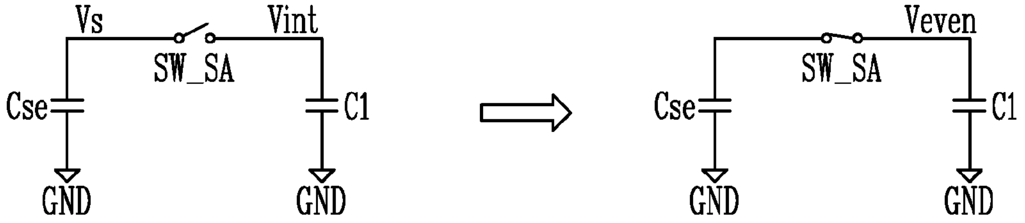
FIG. 12 is a diagram for describing an offset of second sensing data compared to first sensing data.

FIG. 12 is a diagram for describing an offset of second sensing data compared to first sensing data. FIG. 12 provides an equivalent and simplified illustration of a sensing channel, illustrating that the first capacitor C1 is connected to the base potential supply GND.

Referring to FIG. 12, after the second sensing capacitor Cse is charged with a second sensing voltage Vs while the first capacitor C1 is supplied (that is, charged) with an initialization voltage Vint, the sampling switch SW_SA is turned on. After the sampling switch SW_SA is turned on, the voltage (e.g., the second sensing voltage) of the first capacitor C1 may be changed to a constant voltage Veven. Here, the constant voltage Veven may be a voltage applied to the first capacitor C1 in response to the second sensing voltage. The constant voltage Veven may be used to generate the second sensing data Sdata(e).

As described above, the second sensing data Sdata(e) may have a sensing deviation (that is, an offset) compared to the first sensing data Sdata(o). The offset may be represented by Equation 1:

[Equation 1]

$$Qtotal = Cse \times Vs + C1 \times Vint$$

$$Veven = Qtotal / (Cse + C1)$$

$$Veven = (Cse / (Cse + C1)) \times Vs + (C1 / (Cse + C1)) \times Vint$$

$$offset = Vs - Veven = Vs - ((Cse / (Cse + C1)) \times VS + (C1 / (Cse + C1)) \times Vint)$$

In Equation 1, Qtotal denotes a total charge quantity, and Veven denotes the aforementioned constant voltage.

Here, a ratio of the second sensing capacitor Cse and the first capacitor C1 may be represented by Equation 2:

[Equation 2]

$$Cse : C1 = (Veven - Vint) : (Vs - Veven)$$

In Equation 2, Vs−Veven may correspond to the offset in Equation 1.

Here, in an actual sensing process, the offset may be determined as a value obtained by subtracting the second sensing data Sdata(e) generated from the second pixel PXi2 during the divided sensing period from the normal sensing data Sdata(n) generated from the second pixel PXi2 during the normal sensing period.

Equation 1 represents the offset mathematically. In the present disclosure, the offset may be calculated using the value obtained by subtracting the second sensing data Sdata (e) generated from the second pixel PXi2 during the divided sensing period from the normal sensing data Sdata(n) generated from the second pixel PXi2 during the normal sensing period.

In Equation 2, the constant voltage Veven may be a voltage for generating the second sensing data Sdata(e). Hence, the constant voltage Veven may be calculated using the second sensing data Sdata(e). Vint refers to the voltage of the initialization power supply Vint, and a voltage to be supplied during a design process may be determined.

Figure 13:
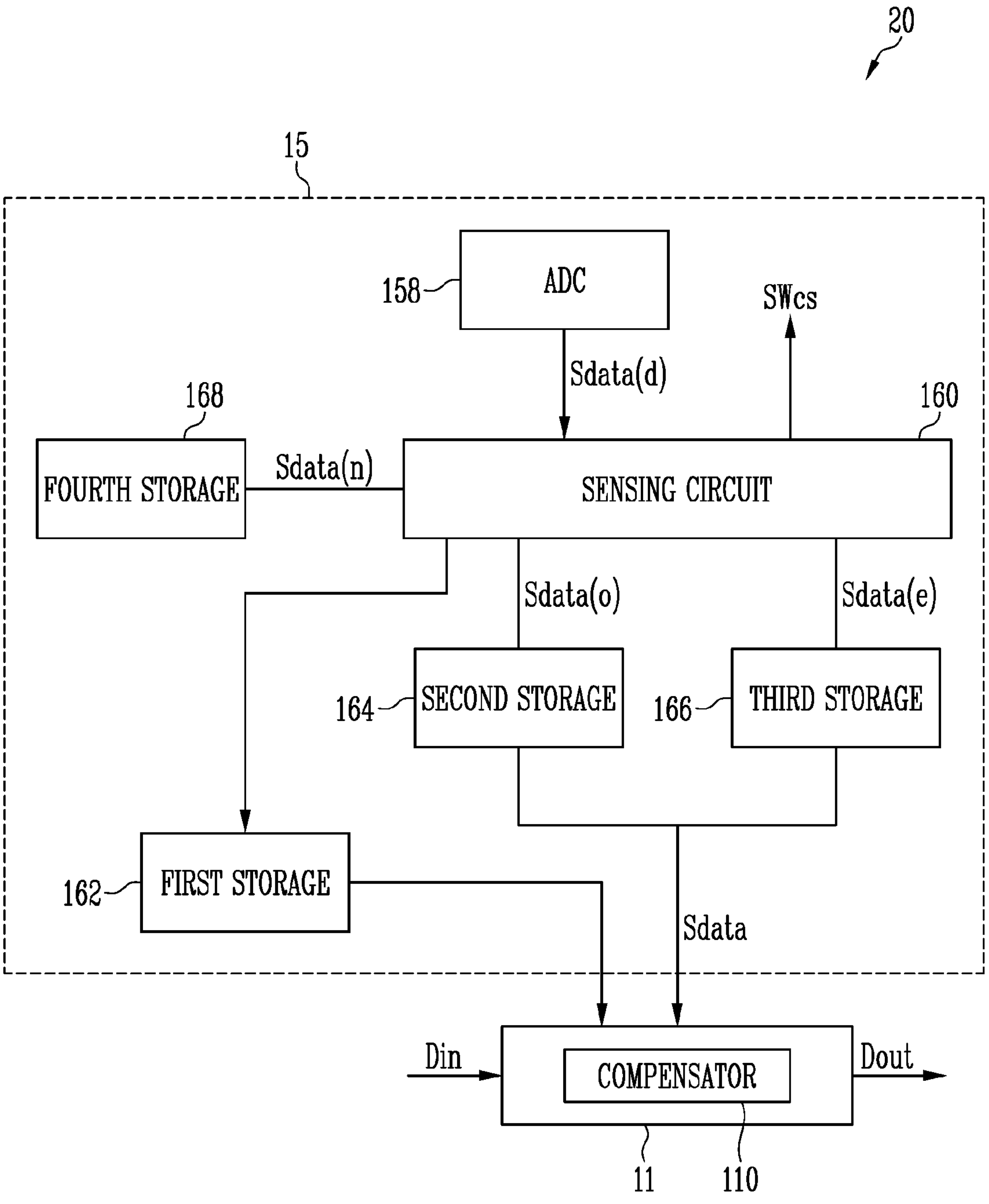
FIGS. 13 and 14 are diagrams each illustrating a driving circuit in accordance with an embodiment of the present disclosure.
Figure 14:
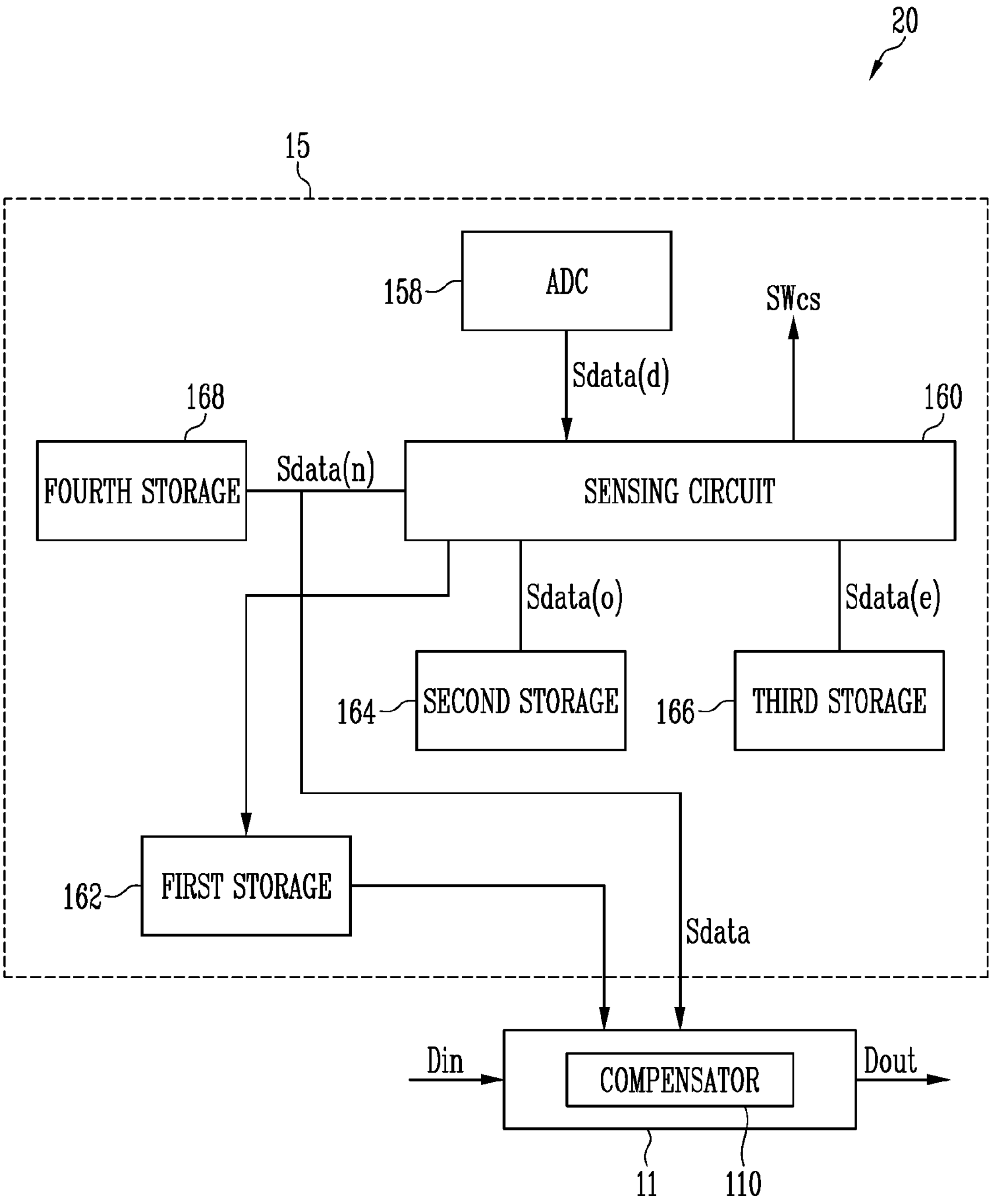

FIGS. 13 and 14 are diagrams each illustrating the driving circuit 20 in accordance with an embodiment of the present disclosure.

Referring to FIGS. 13 and 14, the driving circuit 20 in accordance with an embodiment of the present disclosure may include a sensing component 15 and a timing controller 11.

The sensing component 15 may further include sensing channels, as shown in FIG. 4, and an ADC 158 connected to the sensing channels. Although, for the sake of clarity, FIG. 13 depicts a single ADC 158, it should be noted that embodiments of the present disclosure are not limited thereto. For another example, the sensing component 15 may include a plurality of ADCs 158.

The sensing component 15 may include a sensing circuit 160, a first storage 162, a second storage 164, a third storage 166, and a fourth storage 168.

The fourth storage 168 may store normal sensing data Sdata(n) generated during the normal sensing period. Here, the normal sensing data Sdata(n) may include sensing data of the first pixels PXo and/or the second pixels PXe.

The second storage 164 may store first sensing data Sdata(o) of the first pixels PXo that is generated during the divided sensing period. The third storage 166 may store second sensing data Sdata(e) of the second pixels PXe that is generated during the divided sensing period. The first storage 162 may store line capacitance information of the sensing lines 1l to lm.

The sensing circuit 160 may control operations of turning on or turning off the switches SW_CHo, SW_CHe, SW_SA, SW_ini, SW1, SW2, SW3, SW4, and SW5 included in the sensing channel during the normal sensing period and the divided sensing period (including the first sensing period and the second sensing period). To this end, the sensing circuit 160 may supply a switch control signal SWcs to the sensing channels.

The sensing circuit 160 may use the normal sensing data Sdata(n) stored in the fourth storage 168, the first sensing data Sdata(o) stored in the second storage 164, and the second sensing data Sdata(e) stored in the third storage 166 to generate a line capacitance of at least one sensing line (i.e., at least one of 1l to lm). Here, at leas tone sensing line may include a plurality of sub-sensing lines. The sensing circuit 160 may generate line capacitances for the sub-sensing lines. The line capacitances generated in the sensing circuit 160 may be stored in the first storage 162.

The timing controller 11 may include a compensator 110. The compensator 110 may correct the sensing data Sdata using the line capacitance information of each of the sensing lines stored in the first storage 162. The compensator 110 may correct the sensing data Sdata to compensate for a deviation of the line capacitance of each of the sensing lines. Subsequently, the compensator 110 may apply the corrected sensing data Sdata to the input data Din, thus generating output data Dout.

Although FIG. 13 illustrates that the sensing component 15 includes the first storage 162, the second storage 164, the third storage 166, and the fourth storage 168, embodiments of the present disclosure are not limited thereto. For another example, at least one storage of the first storage 162, the second storage 164, the third storage 166, and the fourth storage 168 may be included in the timing controller 11. Furthermore, the first storage 162, the second storage 164, the third storage 166, and the fourth storage 168 may be implemented using at least one register, latch, memory, and the like in an embodiment.

In addition, although FIG. 13 illustrates that the sensing data Sdata obtained by a combination of the first sensing data Sdata(o) and the second sensing data Sdata(e) is supplied to the timing controller 11, embodiments of the present disclosure are not limited thereto. For another example, as shown in FIG. 14, the normal sensing data Sdata(n) may be supplied to the timing controller 11 as the sensing data Sdata.

In an embodiment, in the case where the display device 10 is driven with a general sensing period, the sensing component 15 may be driven with a normal sensing period or a divided sensing period. In an embodiment, for example, in the case where the sensing component 15 is driven to include the normal sensing period, the normal sensing data Sdata(n) may be supplied to the timing controller 11 as the sensing data Sdata. For instance, in the case where the sensing component 15 is driven to include the divided sensing period, the first and second sensing data Sdata(o) and Sdata(e) may be supplied to the timing controller 11 as the sensing data Sdata.

Figure 15:
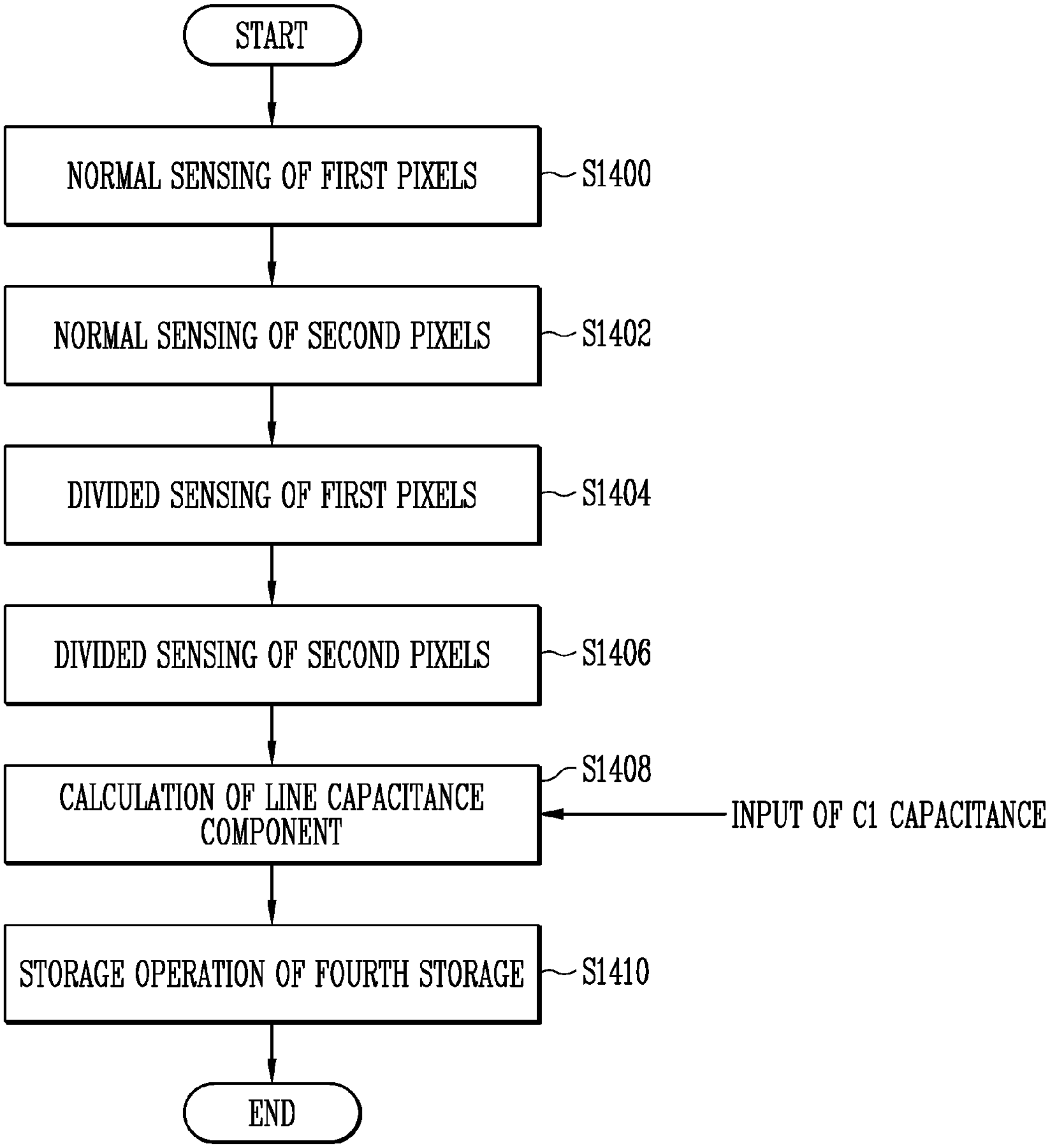
FIG. 15 is a flowchart illustrating a process of generating line capacitance information of second sub-sensing lines.
Figure 16:
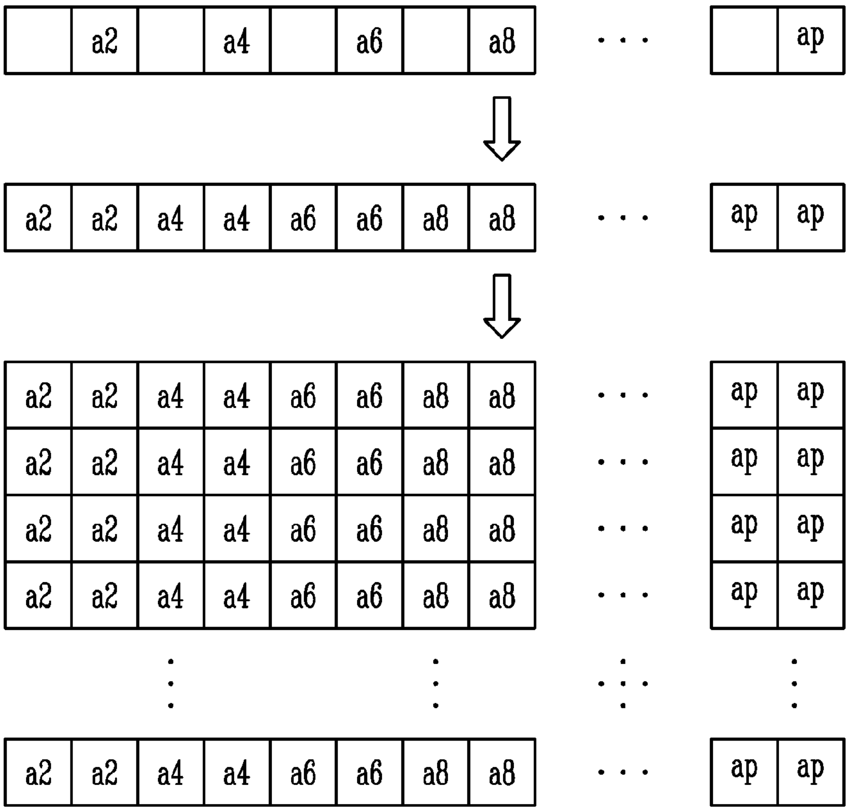
FIG. 16 is a diagram illustrating an embodiment of a process of storing line capacitance information in a first storage.

FIG. 15 is a flowchart illustrating a process of generating line capacitance information of second sub-sensing lines. FIG. 16 is a diagram illustrating an embodiment of a process of storing line capacitance information in a first storage.

Referring to FIG. 15, the sensing circuit 160 may normally sense the first pixels PXo (e.g., during the first normal sensing period) and generate normal sensing data Sdata(n) (e.g., first normal sensing data), and may store the generated normal sensing data Sdata(n) in the fourth storage 168 (at step S1400). In addition, in the case where only the line capacitances of the second sub-sensing lines are generated from the sensing circuit 160, step S1400 may be omitted.

After step S1400, the sensing circuit 160 may normally sense the second pixels PXe (e.g., during the second normal sensing period) and generate normal sensing data Sdata(n) (e.g., second normal sensing data), and may store the generated normal sensing data Sdata(n) in the fourth storage 168 (at step S1402).

After step S1402, the sensing circuit 160 may sense the first pixels PXo during the first sensing period within the divided sensing period and generate first sensing data Sdata (o), and may store the generated first sensing data Sdata(o) in the second storage 164 (at step S1404).

After step S1404, the sensing circuit 160 may sense the second pixels PXe during the second sensing period within the divided sensing period and generate second sensing data Sdata(e), and may store the generated second sensing data Sdata(e) in the third storage 166 (at step S1406).

Thereafter, the sensing circuit 160 may calculate line capacitances of the second sub-sensing lines connected to the second pixels PXe sensed during the second sensing period (at step S1408). In an embodiment, for example, the sensing circuit 160 may determine an offset, denoted as "(Vs−Veven)" in Equation 2, by subtracting the second sensing data Sdata(e) from each of the normal sensing data Sdata(n) of the second pixels PXe. The sensing circuit 160 may determine "Veven" in Equation 2 using the second sensing data Sdata(e). "Vint" in Equation 2 may be a known value and prestored in the register of the sensing circuit 160.

In an embodiment, the sensing circuit 160 may receive a capacitance value of the first capacitor C1 from an external device (or the capacitance value of the first capacitor C1 may be prestored in the register of the sensing circuit 160). The capacitance of the first capacitor C1 may receive a designed value. In an embodiment, first capacitors C1 formed in each panel may be set to substantially the same value. The capacitance of the first capacitor C1 may be set to "1".

Thereafter, the sensing circuit 160 may determine a capacitance of the second sensing capacitor Cse using Equation 2. Here, the capacitance of the second sensing capacitor Cse may include line capacitance information. In an embodiment, for example, on the assumption that second sensing capacitors Cse formed in the same panel have the same capacitance, the capacitance determined from Equation 2 may correspond to the line capacitance. In other words, the sensing circuit 160 may determine the line capacitances of the second sub-sensing lines connected to the second pixels PXe, at step S1408, and may store corresponding line capacitance information in the first storage 162 (at step S1410).

The line capacitances of the second sub-sensing lines connected to the second pixels PXe in a specific pixel row may be stored as "a2, a4, a6, a8, . . . , ap", as shown in FIG. 16. The line capacitances of the first sub-sensing lines connected to the first pixels PXo may be similar or identical to the line capacitances of the second sub-sensing lines that share the same sensing channel with the first sub-sensing lines.

Therefore, the sensing circuit 160 may store the line capacitance information in the first storage 162 to allow the sub-sensing lines to have the same line capacitance when sharing the same sensing channel. In an embodiment, for example, the line capacitance information may be stored in the first storage 162 as "a2, a2, a4, a4, a6, a6, a8, a8, . . . , ap, ap" corresponding to the specific pixel row.

In addition, although the description provided states that the line capacitance information is stored to allow the sub-sensing lines to have the same line capacitance when sharing the same sensing channel, it should be noted that embodiments of the present disclosure are not limited thereto. For another example, the sensing circuit 160 may interpolate the line capacitance of the second sub-sensing lines to generate the line capacitance of the first sub-sensing lines adjacent thereto.

Subsequently, the sensing circuit 160 may uniformly apply the line capacitance information of the specific pixel row to all of the pixel rows included in the pixel component 14, and may store the related information in the first storage 162. A single panel may be formed through the same manufacturing process, and the line capacitance of the specific pixel row may be set to be similar or identical to the line capacitances of the other rows. In the case where the line capacitance information of the specific pixel row is applied to all of the pixel rows, a period of storing the line capacitance information in the first storage 162 may be minimized.

The line capacitance information may be prestored at the step of fabricating the display device 10. Furthermore, after the display device 10 has been shipped, the line capacitance information may be stored in (that is, updated to) the first storage 162 every cycle through the process of FIG. 15. In this case, even if the line capacitance is changed by the use of the display device 10, the changed information may be updated every cycle, thus securing the reliability of the compensation.

Figure 17:
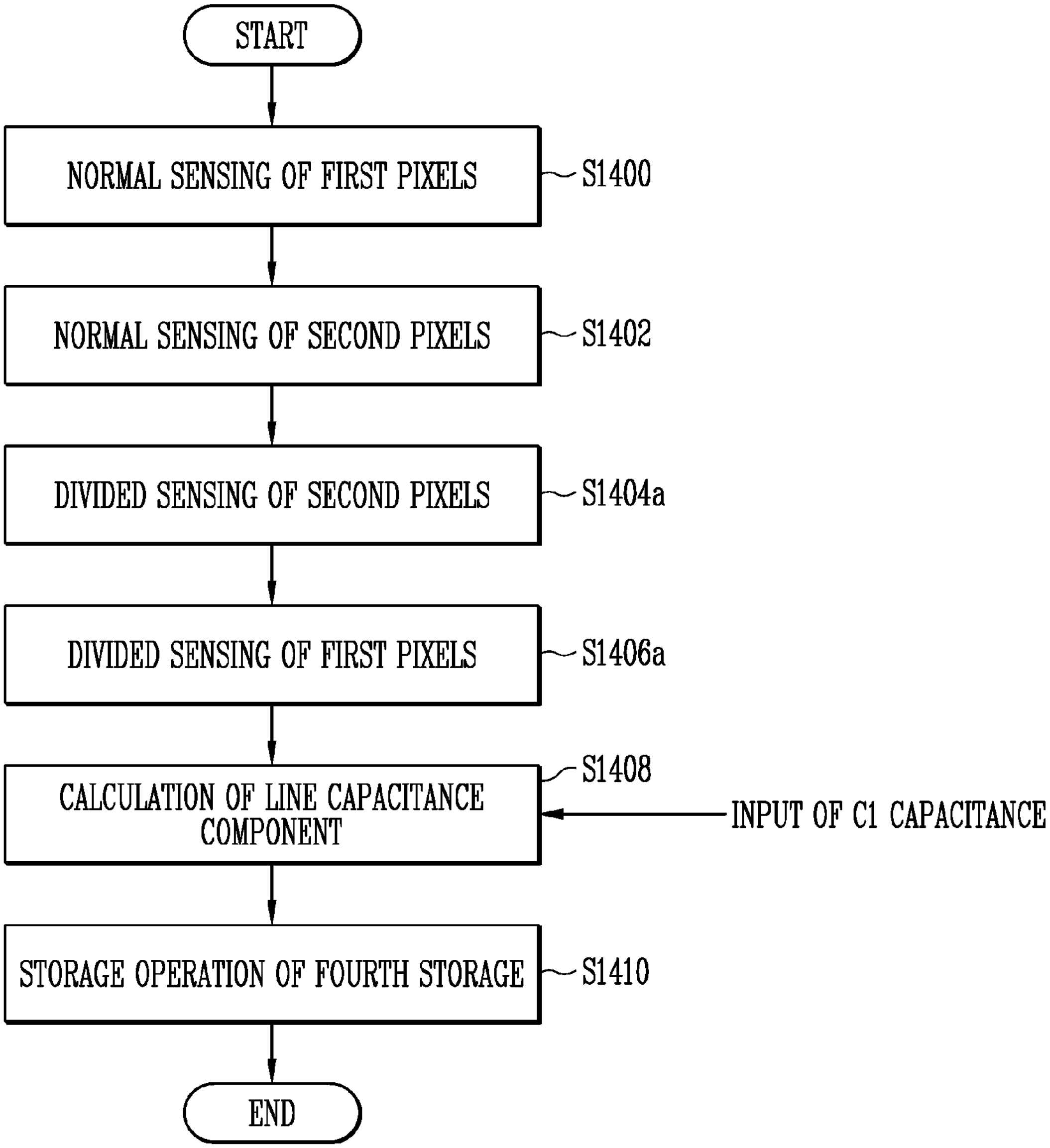
FIG. 17 is a flowchart illustrating a process of generating line capacitance information of first sub-sensing lines.
Figure 18:
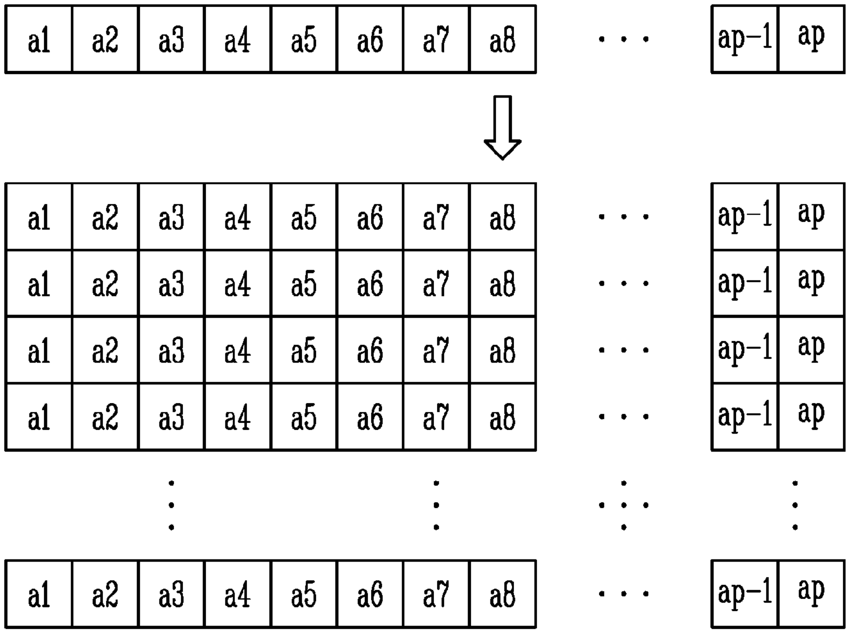
FIG. 18 is a diagram illustrating an embodiment of a process of storing line capacitance information in a first storage.

FIG. 17 is a flowchart illustrating a process of generating the line capacitance information of the first sub-sensing lines. FIG. 18 is a diagram illustrating an embodiment of a process of storing the line capacitance information in the first storage. In the following description of FIG. 17, redundant explanation pertaining to the same configuration as that of FIG. 15 will be omitted.

Referring to FIG. 17, compared to FIG. 15, there are some differences in that the second pixels PXe are sensed during the first sensing period within the divided sensing period, and the first pixels PXo are sensed during the second sensing period (at step S1404*a* and S1406*a*).

In this case, the sensing circuit 160 may calculate line capacitances of the first sub-sensing lines connected to the first pixels PXo (at step S1408). The sensing circuit 160 may generate line capacitance information of the entire pixel rows using the line capacitance information of the first sub-sensing lines, and stores the generated line capacitance information in the first storage 162.

In addition, if the sensing process of FIG. 15 and the sensing process of FIG. 17 are performed, line capacitance of each of the first sub-sensing lines and the second sub-sensing lines included in a specific pixel row may be generated, as shown in FIG. 18. In an embodiment, for example, as shown in FIG. 18, the line capacitance of the specific pixel row may be set to "a1, a2, a3, a4, a5, a6, a7, a8, . . . , ap−1, ap".

Subsequently, the sensing circuit 160 may copy the line capacitance information of the specific pixel row and generate line capacitance information of the entire pixel rows, and may store the generated line capacitance information in the first storage 162.

Although in the description provided above, it is stated that the line capacitance information of the specific pixel row is used to generate the line capacitance information of the entire pixel rows, embodiments of the present are not limited thereto. For another example, at the step of fabricating the display device 10, the line capacitance information of the entire pixel rows may be generated and stored in the first storage 162.

In addition, as described with reference to FIG. 13 or the like, the line capacitance information may be stored in the first storage 162. The compensator 110 may correct the sensing data Sdata using the line capacitance information of each of the sensing lines stored in the first storage 162. The compensator 110 may correct the sensing data Sdata to compensate for a deviation of the line capacitance of each of the sensing lines. Subsequently, the compensator 110 may apply the corrected sensing data Sdata to the input data Din, thus generating output data Dout.

Figure 19:
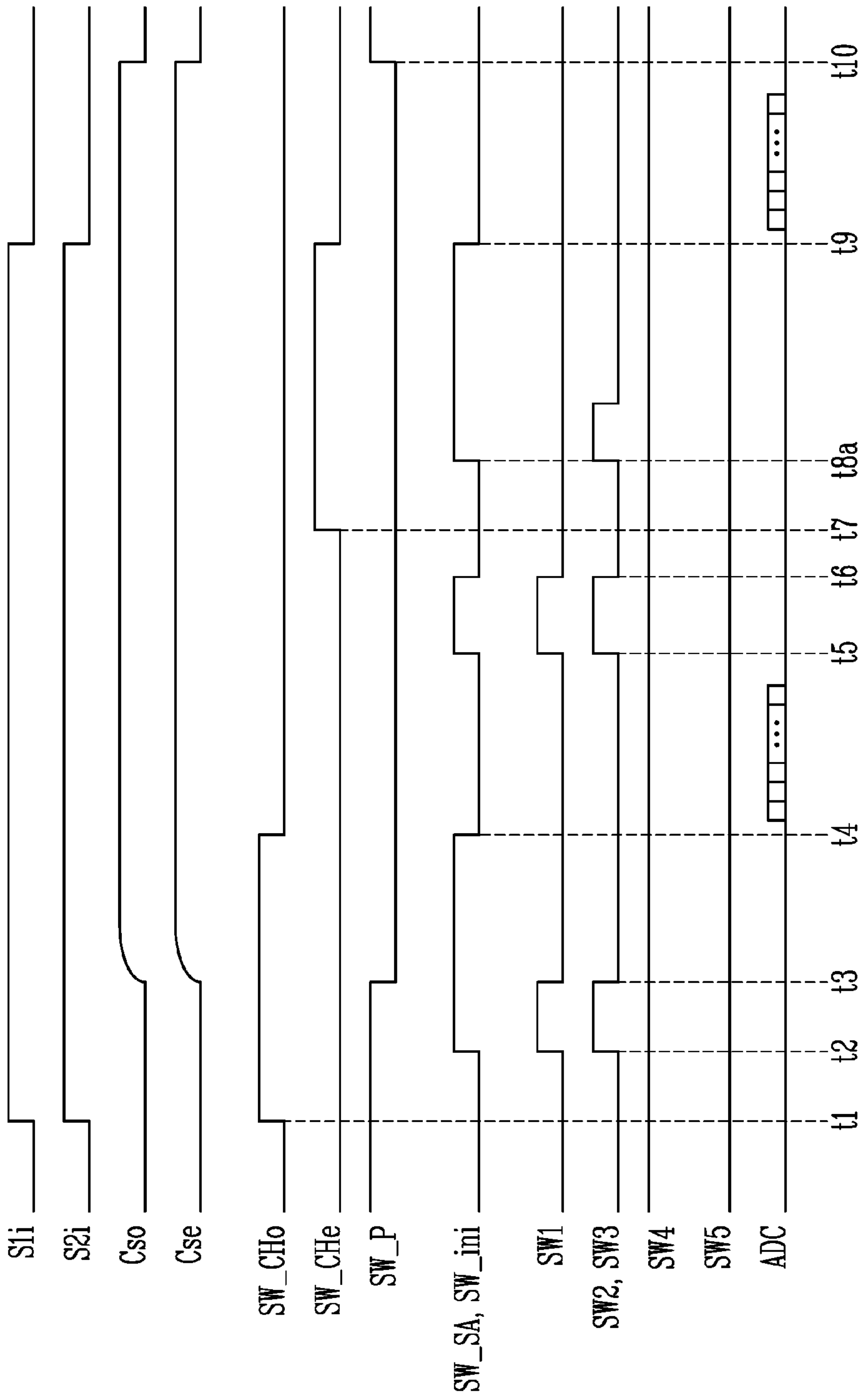
FIG. 19 is a diagram illustrating an embodiment of a driving waveform to be supplied during a divided sensing period.

FIG. 19 is a diagram illustrating an embodiment of a driving waveform to be supplied during a divided sensing period. In the following description of FIG. 19, redundant explanation pertaining to the same configuration as that of FIG. 10A will be omitted.

Referring to FIGS. 4 and 19, the second switch SW2 and the third switch SW3 may be turned on during a certain period between an 8a-th time point t8*a* and a ninth time point t9. If the second switch SW2 and the third switch SW3 are turned on, the voltage of the reference power supply Vref may be supplied to the sampling line SA and the reference line RL. In this case, the voltage of the sampling line SA may be prevented from rapidly varying in response to the voltage of the twelfth node N12.

Figure 20:
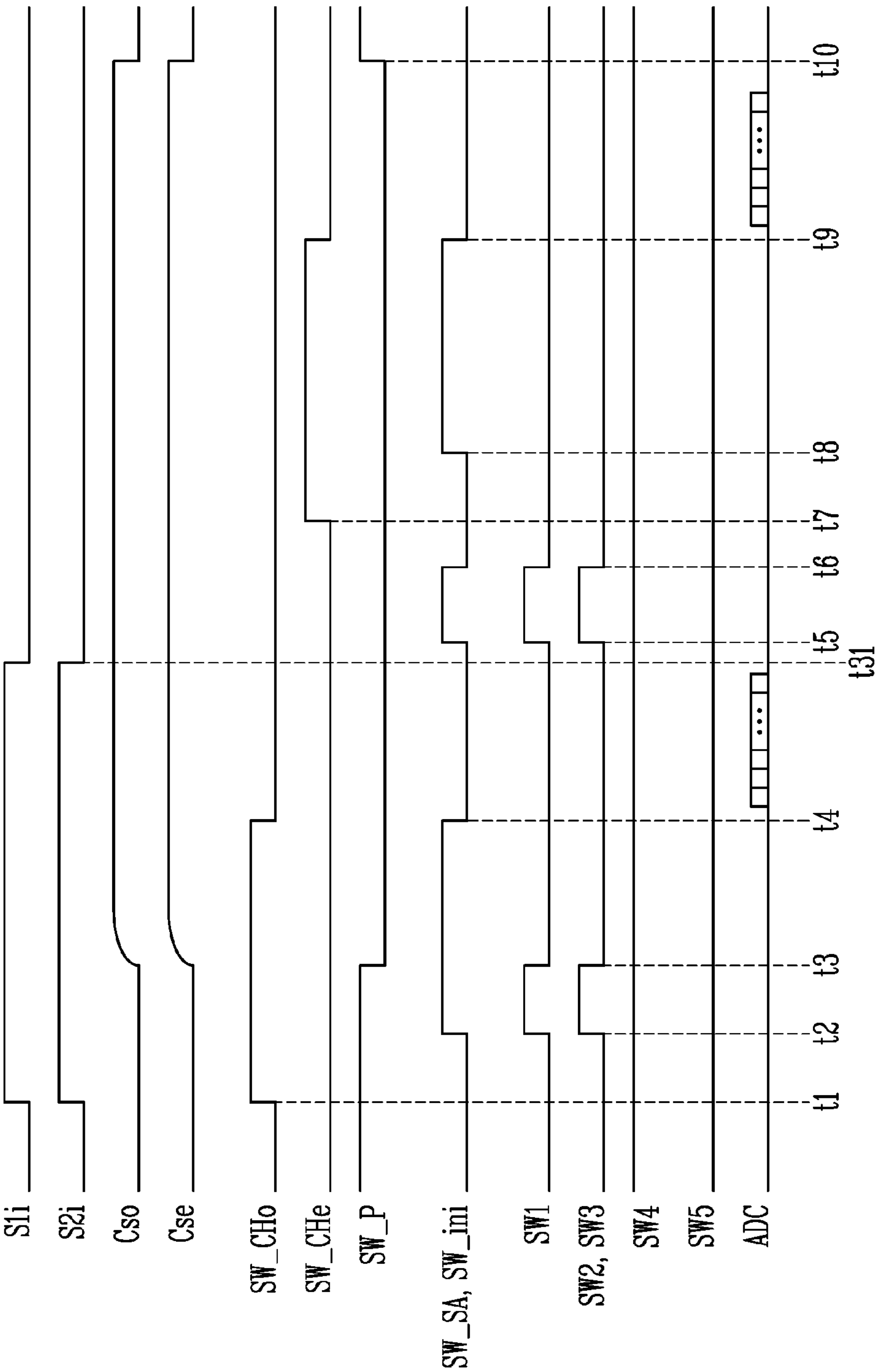
FIG. 20 is a diagram illustrating an embodiment of a driving waveform to be supplied during a divided sensing period.

FIG. 20 is a diagram illustrating an embodiment of a driving waveform to be supplied during a divided sensing period. In the following description of FIG. 20, redundant explanation pertaining to the same configuration as that of FIG. 10A will be omitted.

Referring to FIGS. 4 and 20, at a 31-th time point t31 positioned between the fourth time point t4 and the fifth time point t5, the supply of the first scan signal to the first scan line S1*i* and the supply of the second scan signal to the second scan line S2*i* may be interrupted.

If the supply of the first scan signal to the first scan line S1*i* is interrupted, the second transistor M2 included in each of the pixels is turned off. If the supply of the second scan signal to the second scan line S2*i* is interrupted, the third transistor M3 included in each of the pixels is turned off.

Because each of the first sensing capacitor Cso and the second sensing capacitor Cse has been charged with the sensing voltage before the 31-th time point t31, the sensing process may be performed regardless of the turn-off of the transistors M2 and M3.

Figure 21:
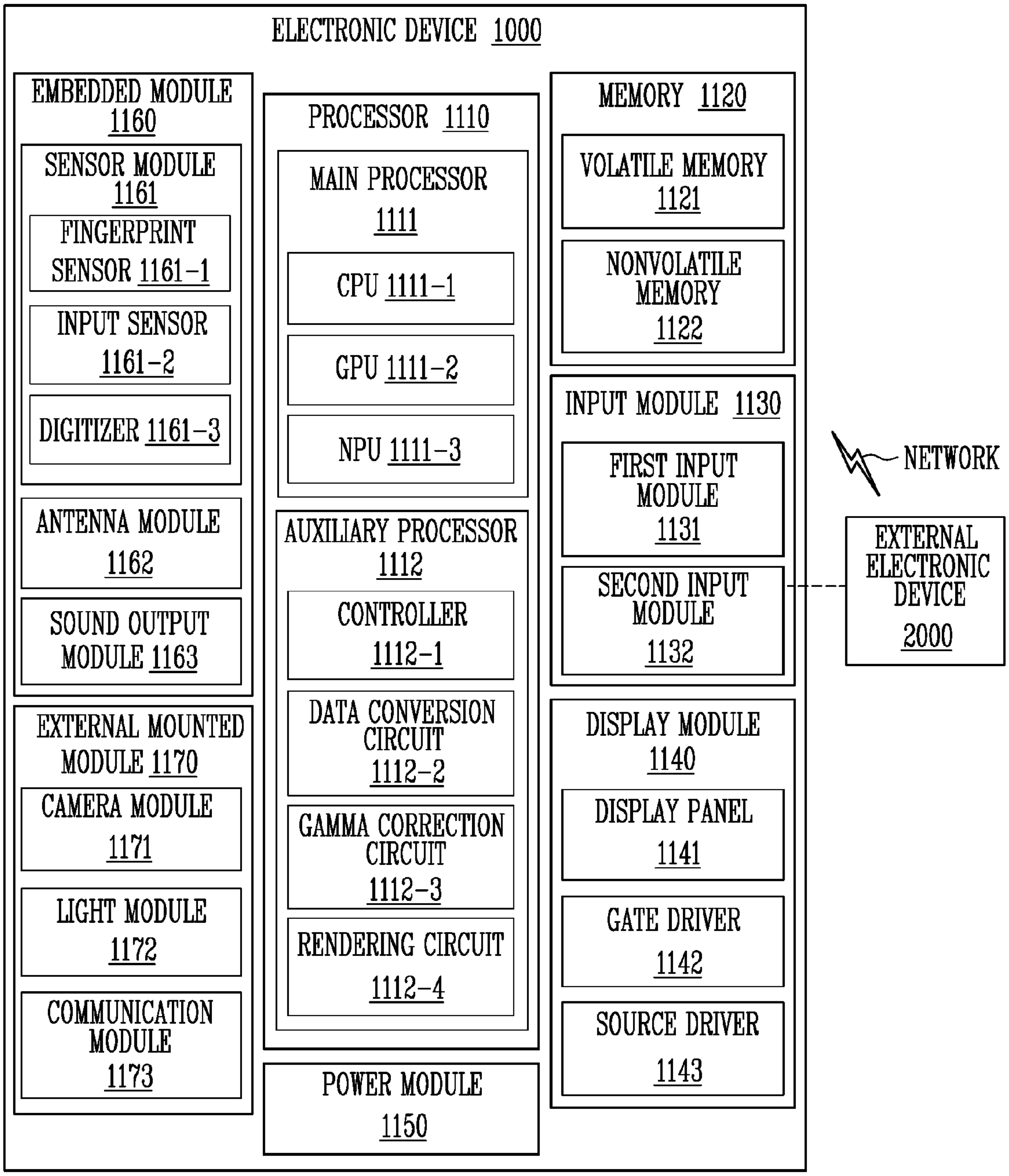
FIG. 21 is a diagram illustrating an electronic device in accordance with an embodiment of the present disclosure.

FIG. 21 is a diagram illustrating an electronic device 1000 in accordance with an embodiment of the present disclosure.

Referring to FIG. 21, the electronic device 1000 in accordance with an embodiment of the present disclosure may output a variety of information through a display module 1140. If a processor 1110 executes an application stored in a memory 1120, the display module 1140 may provide application information to the user through a display panel 1141.

The processor 1110 may obtain an external input through an input module 1130 or a sensor module 1161, and execute an application corresponding to the external input. In an embodiment, for example, in the case where the user selects a camera icon (that is, a camera application icon) displayed on the display panel 1141, the processor 1110 may obtain a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

As another example, in the case where personal information authentication is executed through the display module 1140, a fingerprint sensor 1161-1 may obtain inputted fingerprint information as input data. The processor 1110 may compare input data obtained through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be disposed to make it possible to obtain fingerprint information in the overall area of the display module 1140 (that is, the display panel 1141).

As a further example, in the case where a music streaming icon displayed on the display module 1140 is selected, the processor 1110 may obtain a user input through the input sensor 1161-2, and activate a music streaming application stored in the memory 1120. If a music playing command is inputted in the music streaming application, the processor 1110 may activate a sound output module 1163 and provide sound information corresponding to the music playing command to the user.

Hitherto, the operation of the electronic device 1000 has been schematically described. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). In an embodiment, the electronic device 1000 may include a processor 1110, a memory 1120, an input module 1130, a display module 1140, a power module 1150, an embedded module 1160, and an external mounted module 1170. In an embodiment, in the electronic device 1000, at least one of the foregoing components may be omitted, or one or more other components may be added. In an embodiment, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. In an embodiment, as at least a portion of a data processing or computing operation, the processor 1110 may store, in a volatile memory 1121, a command or data received from another component (e.g., the input module 1130, the sensor module 1161, or a communication module 1173), process the command or data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include one or more of a graphic processing unit (GPU) 1111-2, a communication processor ("CP"), and an image signal processor ("ISP"). The main processor 1111 may further include a neural processing unit ("NPU") 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network ("DNN"), a convolutional neural network ("CNN"), a recurrent neural network ("RNN"), a restricted boltzmann machine ("RBM"), a deep belief network ("DBN"), a bidirectional recurrent deep neural network ("BRDNN"), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. The controller 1112-1 may receive an image signal from the main processor 1111, and may convert a data format of the image signal to a format corresponding to specifications of an interface with the display module 1140 and output image data. The controller 1112-1 may output various control signals to drive the display module 1140.

The auxiliary processor 1112 may further include a data conversion circuit 1112-2, a gamma correction circuit 1112-3, a rendering circuit 1112-4, a touch control circuit 1112-5, which is not shown, and the like in an embodiment. The data conversion circuit 1112-2 may receive image data from the controller 1112-1, compensate for the image data to allow an image to be displayed at a desired luminance according to characteristics of the electronic device 1000 or settings of the user, or may convert the image data to reduce power consumption or compensate for afterimages.

The controller 1112-1 and the data conversion circuit 1112-2 may include the driving circuit 20 shown in FIG. 1. In an embodiment, for example, the controller 1112-1 and the data conversion circuit 1112-2 may be integrated into a single IC, which may include the configuration of the driving circuit 20.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit may supply a touch signal to the input sensor 1161-2, and receive a sensing signal from the input sensor 1161-2 in response to the touch signal.

At least one of the data conversion circuit 1112-2, the gamma correction circuit 1112-3, the rendering circuit 1112-4, and the touch control circuit may be integrated into another component (e.g., the main processor 1111 or the controller 1112-1). At least one of the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the data. Furthermore, the memory 1120 may store a variety of setting data corresponding to settings of the user. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data inputted from the user, and a second input module 1132 configured to receive a command or data inputted from the external electronic device 2000. The first input module 1131 may include a microphone, a mouse, a keyboard, a key (e.g., a button), or a pen (e.g., a passive pen or an active pen). The second input module 1132 may support a designated protocol, which can be connected to the external electronic device 2000 in a wired or wireless manner. In an embodiment, the second input module 1132 may include a high definition multimedia interface ("HDMI"), a universal serial bus ("USB") interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, and a source driver 1143. The display module 1140 may further include a window, a chassis, and a bracket to protect the display panel 1141.

The display panel 1141 (that is, a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which may support the display panel 1141.

The gate driver 1142 may be mounted on the display panel 1141 as a driving chip. The gate driver 1142 may be integrated on the display panel 1141. In an embodiment, for example, the gate driver 1142 may include an amorphous silicon TFT gate ("ASG") driver circuit, a low temperature polycrystalline silicon ("LTPS") TFT gate driver circuit, or an oxide semiconductor TFT gate ("OSG") driver circuit, which is internalized in the display panel 1141. The gate driver 1142 may receive a control signal from the controller 1112-1, and output scan signals to the display panel 1141 in response to the control signal. The gate driver 1142 may include the scan driver 13 illustrated in FIG. 1.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 12 illustrated in FIG. 1.

The source driver 1143 may be integrated into another component (e.g., the controller 1112-1). The functions of the interface conversion circuit and the timing control circuit of the controller 1112-1 may be integrated into the source driver 1143.

The display module 1140 may further include a voltage generation circuit. The voltage generation circuit may output various voltages to drive the display panel 1141. In an embodiment, the display panel 1141 may include a plurality of pixel columns each including a plurality of pixels.

In an embodiment, the source driver 1143 may convert data that is included in image data received from the processor 1110 and corresponds to red (R), green (G), and blue (B) to a red data signal (that is, a data voltage), a green data signal, and a blue data signal, and provide the data signals to a plurality of pixel columns included in the display panel 1141 during one horizontal period.

The power module 1150 may supply power to the components of the electronic device 1000. The power module 1150 may include a battery to store power voltage. The battery may include a primary cell, which cannot be recharged, and a secondary cell or a fuel cell, which are rechargeable. The power module 1150 may include a power management integrated circuit ("PMIC"). The PMIC may supply optimized power to each of the foregoing modules and modules to be described below. The power module 1150 may include a wireless power transceiver that is electrically connected with the battery. The wireless power transceiver may include a plurality of coiled antenna radiators.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from the body of the user or an input from a pen of the first input module 1131, and generate an electric signal or a data value corresponding to the input. The sensor module 1161 may include at least one or more of a fingerprint sensor 1161-1, an input sensor 1161-2, and a digitizer 1161-3.

The fingerprint sensor 1161-1 may generate a data value corresponding to the fingerprint of the user. The fingerprint sensor 1161-1 may include one of an optical fingerprint sensor and a capacitive fingerprint sensor.

The input sensor 1161-2 may generate a data value corresponding to coordinate information of an input from the body of the user or an input from the pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, or body fat. In an embodiment, for example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, and the digitizer 1161-3 may be implemented as a sensor layer formed on the display panel 1141 through a successive process. At least one of the fingerprint sensor 1161-1, the input sensor 1161-2, and the digitizer 1161-3 may be disposed over the display panel 1141. One of the fingerprint sensor 1161-1, the input sensor 1161-2, and the digitizer 1161-3, for example, the digitizer 1161-3, may be disposed under the display panel 1141.

At least two or more of the fingerprint sensor 1161-1, the input sensor 1161-2, and the digitizer 1161-3 may be formed to be integrated into a single sensing panel through the same process. In the case where at least two or more of the fingerprint sensor 161-1, the input sensor 161-2, and the digitizer 161-3 are integrated into a single sensing panel, the sensing panel may be disposed between the display panel 1141 and a window disposed over the display panel 1141. In an embodiment, the sensing panel may be disposed on the window, and the position of the sensing panel is not particularly limited.

At least one of the fingerprint sensor 1161-1, the input sensor 1161-2, and the digitizer 1161-3 may be embedded in the display panel 1141. In other words, during a process of forming components (e.g., a light emitting element, a transistor, and the like) included in the display panel 1141, at least one of the fingerprint sensor 1161-1, the input sensor 1161-2, and the digitizer 1161-3 may be formed simultaneously with the components.

In addition, the sensor module 1161 may generate an electrical signal or data value corresponding to internal conditions or external conditions of the electronic device 1000. In an embodiment, the sensor module 1161 may further include, for example, a gesture sensor, a gyroscope sensor, an atmospheric sensor, a magnetic sensor, an acceleration sensor, a grip sensor, a proximity sensor, a color sensor, an infrared ("IR") sensor, a biometric sensor, a temperature sensor, a humidity sensor, or an illuminance sensor.

The antenna module 1162 may include one or more antennas to transmit or receive a signal or power to or from an external device. In an embodiment, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. In an embodiment, the receiver may be integrally or separately formed with a speaker. A sound output pattern of the sound output module 1163 may be integrated into the display module 1140.

The camera module 1171 may capture a static image or a video. In an embodiment, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wire or wireless communication channel between the electronic device 1000 and the external electronic device 2000, and support execution of communication through the formed communication channel. In an embodiment, the communication module 1173 may include either or both a wireless communication module such as a cellular communication module, a short-range wireless communication module, or a global navigation satellite system ("GNSS") communication module, and a wire communication module such as a local area network ("LAN") communication module, or a power line communication module. The communication module 1173 may communicate with the external electronic device 2000 through a short-range communication network such as Bluetooth, WiFi Direct or infrared data association ("IrDA"), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interlocking with the processor 1110, may be used to control the operation of the display module 1140

The processor 1110 may output a command or data to the display module 1140, the sound output module 1163, the camera module 1171, or the light module 1172, based on input data received from the input module 1130. In an embodiment, for example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. In an embodiment, for example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. In an embodiment, for example, the processor 1110 that has determined whether the user is present through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output ("GPIO"), a serial peripheral interface ("SPI"), a mobile industry processor interface ("MIPI"), or an ultra path interconnect ("UPI") link, which can be used between peripheral devices, and may thus exchange a signal (e.g., a command or data) therebetween. The processor 1110 may communicate with the display module 1140 through a predefined interface. In an embodiment, for example, one of the foregoing communication schemes may be used, and the interface is not limited to the foregoing communication schemes.

In a driving circuit, a display device including the driving circuit, and a method of driving the display device in accordance with embodiments of the present disclosure, a line capacitance of entire pixels included in a pixel component is determined, and sensing data can be corrected using the line capacitance. In this case, characteristics of the pixels may be compensated for regardless of deviations in line capacitance between respective sensing lines.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims.

What is claimed is:

1. A driving circuit comprising:

a sensing component including a sensing channel shared by a first sub-sensing line connected to a first pixel and a second sub-sensing line connected to a second pixel;

a first storage configured to store line capacitance information of the first sub-sensing line and the second sub-sensing line; and a timing controller configured to generate corrected sensing data supplied from the sensing component using the line capacitance information, wherein the timing controller comprises a compensator that compensates for a deviation of the line capacitance of the first sub-sensing line and the second sub-sensing line, the corrected sensing data compensating for the deviation of the line capacitance, and generate output data using the corrected sensing data.

2. The driving circuit according to claim 1, further comprising:

a second storage configured to store first sensing data generated from the first pixel during a first sensing period within a divided sensing period;

a third storage configured to store second sensing data generated from the second pixel during a second sensing period within the divided sensing period; and a fourth storage configured to store first normal sensing data generated from the first pixel during a first normal sensing period, and store second normal sensing data generated from the second pixel during a second normal sensing period.

3. The driving circuit according to claim 2, wherein the sensing channel comprises:

a first sensing capacitor connected to the first sub-sensing line, and configured to store a first sensing voltage;

a second sensing capacitor connected to the second sub-sensing line, and configured to store a second sensing voltage; and a sampling switch connected to the first sub-sensing line and the second sub-sensing line, wherein in the first normal sensing period, the second normal sensing period, and the first sensing period, the sampling switch remains turned on during a period in which voltages are stored in the first sensing capacitor and the second sensing capacitor, and in the second sensing period, the sampling switch is set to be turned on after voltages are stored in the first sensing capacitor and the second sensing capacitor.

4. The driving circuit according to claim 2, wherein the sensing component further comprises a sensing circuit configured to determine an offset by subtracting the second sensing data from the second normal sensing data, generate line capacitance information of the second sub-sensing line using the offset, and store the line capacitance information of the second sub-sensing line in the first storage.

5. The driving circuit according to claim 4, wherein the sensing circuit sets the line capacitance information of the first sub-sensing line that shares the sensing channel with the second sub-sensing line, to be identical to the line capacitance information of the second sub-sensing line, and stores the set line capacitance information of the first sub-sensing line in the first storage.

6. The driving circuit according to claim 4, wherein the sensing circuit interpolates the line capacitance information of the second sub-sensing line and generates the line capacitance information of the first sub-sensing line adjacent thereto using the interpolation, and stores the generated line capacitance information of the first sub-sensing line in the first storage.

7. The driving circuit according to claim 4, wherein the line capacitance information stored in the first storage is reset every cycle.

8. A display device, comprising:

first pixels and second pixels located adjacent to each other in a certain pixel row in a pixel component;

first sub-sensing lines connected to the first pixels, respectively;

second sub-sensing lines connected to the second pixels, respectively;

a sensing component including a plurality of sensing channels each of which is shared by one of the first sub-sensing lines and one of the second sub-sensing lines;

a first storage configured to store line capacitance information of the first sub-sensing lines and the second sub-sensing lines; and a timing controller configured to generate corrected sensing data supplied from the sensing component using the line capacitance information, wherein the timing controller comprises a compensator that compensates for a deviation of the line capacitance of the first sub-sensing line and the second sub-sensing line, the corrected sensing data compensating for the deviation of the line capacitance, and generate output data using the corrected sensing data.

9. The display device according to claim 8, wherein the first pixels are positioned in odd-numbered pixel columns, and the second pixels are positioned in even-numbered pixel columns.

10. The display device according to claim 8, including a normal sensing period in which the first pixels and the second pixels are sensed, and a divided sensing period in which the first pixels and the second pixels are sequentially sensed.

11. The display device according to claim 10, further comprising:

a second storage configured to store first sensing data sensed from the first pixels during a first sensing period within the divided sensing period;

a third storage configured to store second sensing data sensed from the second pixels during a second sensing period within the divided sensing period; and a fourth storage configured to store normal sensing data sensed from the first pixels and the second pixels during the normal sensing period.

12. The display device according to claim 11, wherein the sensing data supplied from the sensing component comprises the first sensing data and the second sensing data, or comprises the normal sensing data.

13. The display device according to claim 11, further comprising a sensing circuit configured to determine an offset by subtracting the second sensing data from the normal sensing data corresponding to the second pixels, generate line capacitance information of each of the second sub-sensing lines using the offset, and store the line capacitance information of each of the second sub-sensing lines in the first storage.

14. The display device according to claim 13, wherein the sensing circuit sets the line capacitance information of the first sub-sensing lines in the certain pixel row to be identical to the line capacitance information of the second sub-sensing lines that share the sensing channel with the first sub-sensing lines, and stores the set line capacitance information of the first sub-sensing lines in the first storage.

15. The display device according to claim 14, wherein all pixel rows included in the display device have same line capacitance information as the certain pixel row.

16. The display device according to claim 13, wherein the sensing circuit interpolates the line capacitance information of a second sub-sensing line of the second sub-sensing lines in the certain pixel row and generates the line capacitance information of a first sub-sensing line of the first sub-sensing lines adjacent thereto using the interpolation, and stores the generated line capacitance information of the first sub-sensing line in the first storage.

17. The display device according to claim 13, wherein the line capacitance information stored in the first storage is reset every cycle.

18. The display device according to claim 10, further comprising a sensing circuit configured to:

- sequentially sense the first pixels during a first sensing period within the divided sensing period, and the second pixels during a second sensing period within the divided sensing period, and sequentially sense the second pixels during a first sensing period within a subsequent divided sensing period, and the first pixels during a second sensing period within the subsequent divided sensing period;
- generate line capacitance information of each of the first sub-sensing lines using an offset generated by subtracting first sensing data of the first pixels generated during the second sensing period from normal sensing data corresponding to the first pixels; and
- generate line capacitance information of each of the second sub-sensing lines using an offset generated by subtracting second sensing data of the second pixels generated during the second sensing period from normal sensing data corresponding to the second pixels.

19. A method of driving an electronic device including a plurality of sensing channels, each connected both to one of first sub-sensing lines connected to first pixels and to one of second sub-sensing lines connected to second pixels, the method comprising:

- storing first normal sensing data generated from a first pixel of the first pixels during a first normal sensing period;
- storing second normal sensing data generated from a second pixel of the second pixels during a second normal sensing period;
- storing first sensing data generated from the first pixel during a first sensing period within a divided sensing period;
- storing second sensing data generated from the second pixel during a second sensing period within the divided sensing period; and
- generating output data by adjusting input data based on an offset value generated by subtracting the second sensing data from the second normal sensing data, wherein generating the output data comprises:
  - correcting the first sensing data using line capacitance information of the first sub-sensing line connected to the first pixel;
  - correcting the second sensing data using line capacitance information of the second sub-sensing line connected to the second pixel; and
  - generating the output data using the corrected first sensing data and the corrected second sensing data.

20. The method according to claim 19, wherein the sensing channel comprises: a first sensing capacitor connected to the first sub-sensing line and configured to store a first sensing voltage; a second sensing capacitor connected to the second sub-sensing line and configured to store a second sensing voltage; and a sampling switch connected to the first sub-sensing line and the second sub-sensing line, and wherein in the first normal sensing period, the second normal sensing period, and the first sensing period, the sampling switch remains turned on during a period in which voltages are stored in the first sensing capacitor and the second sensing capacitor, and in the second sensing period, the sampling switch is set to be turned on after voltages are stored in the first sensing capacitor and the second sensing capacitor.

* * * * *